US012475833B2

(12) United States Patent
Shan et al.

(10) Patent No.: US 12,475,833 B2
(45) Date of Patent: Nov. 18, 2025

(54) DRIVING MODULE AND DISPLAY DEVICE

(71) Applicant: BOE TECHNOLOGY GROUP CO., LTD., Beijing (CN)

(72) Inventors: Yue Shan, Beijing (CN); Zhen Wang, Beijing (CN); Jian Sun, Beijing (CN); Deshuai Wang, Beijing (CN); Jian Zhang, Beijing (CN); Wei Yan, Beijing (CN); Wenwen Qin, Beijing (CN); Xiaoyan Yang, Beijing (CN); Han Zhang, Beijing (CN); Yadong Zhang, Beijing (CN); Lu Han, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/574,419

(22) PCT Filed: Nov. 25, 2022

(86) PCT No.: PCT/CN2022/134395
§ 371 (c)(1),
(2) Date: Dec. 27, 2023

(87) PCT Pub. No.: WO2024/108559
PCT Pub. Date: May 30, 2024

(65) Prior Publication Data
US 2025/0104600 A1 Mar. 27, 2025

(51) Int. Cl.
*G09G 3/20* (2006.01)

(52) U.S. Cl.
CPC ... *G09G 3/2096* (2013.01); *G09G 2310/0286* (2013.01); *G09G 2310/0291* (2013.01);
(Continued)

(58) Field of Classification Search
CPC .................. G09G 5/00; G09G 3/2096; G09G 2310/0286; G09G 2310/0291; G09G 2310/0297; G09G 2330/021
See application file for complete search history.

(56) References Cited

U.S. PATENT DOCUMENTS

2003/0188064 A1 10/2003 Dietrich et al.
2018/0061307 A1* 3/2018 Inoue .................. G09G 3/2096
(Continued)

FOREIGN PATENT DOCUMENTS

CN 108447436 A 8/2018
CN 112865805 A 5/2021
(Continued)

*Primary Examiner* — Michael A Faragalla
(74) *Attorney, Agent, or Firm* — WHDA, LLP

(57) ABSTRACT

The present disclosure provides a driving module and a display device. The driving module includes a serial-parallel conversion circuit and a data providing circuit, the serial-parallel conversion circuit is configured to convert a serial input signal into a parallel output signal and generate a transmission control signal and a common electrode voltage signal in accordance with mode indication information carried by the parallel output signal, and the parallel output signal carries the mode indication information and input display data; and the data providing circuit is configured to convert the input display data into output display data and transmit the output display data to a corresponding data line under the control of the transmission control signal. According to the embodiments of the present disclosure, it is able to achieve display through relying on serial input signals and other signals provided by a system without a display chip.

17 Claims, 11 Drawing Sheets

(52) U.S. Cl.
CPC ............... *G09G 2310/0297* (2013.01); *G09G 2330/021* (2013.01)

(56) References Cited

U.S. PATENT DOCUMENTS

| | | | | |
|---|---|---|---|---|
| 2020/0273396 | A1* | 8/2020 | Lu | G09G 3/20 |
| 2021/0158774 | A1 | 5/2021 | Zhu et al. | |

FOREIGN PATENT DOCUMENTS

| | | | |
|---|---|---|---|
| CN | 113539156 | A | 10/2021 |
| CN | 113539163 | A | 10/2021 |
| CN | 115065795 | A | 9/2022 |
| JP | 2006-174139 | A | 6/2006 |

* cited by examiner

DRIVING MODULE AND DISPLAY DEVICE

CROSS-REFERENCE TO RELATED APPLICATIONS

This application is the U.S. national phase of PCT Application No. PCT/CN2022/134395 filed on Nov. 25, 2022, the content of which is incorporated herein by reference.

TECHNICAL FIELD

The present disclosure relates to the field of display technology, in particular to a driving module and a display device.

BACKGROUND

In the related art, a display device may not display only through signals such as a serial input signal provided by a system without a display chip, and display power consumption and display price may not be reduced.

SUMMARY

In one aspect, the present disclosure provides in some embodiments a driving module arranged in a display device, the display device includes a display panel, the display panel includes a plurality of gate lines arranged in rows, a plurality of data lines arranged in columns and a plurality of pixel circuits arranged in rows and columns arranged in a display region; and the driving module includes a serial-parallel conversion circuit and a data providing circuit; the serial-parallel conversion circuit is configured to convert a serial input signal into a parallel output signal and generate a transmission control signal and a common electrode voltage signal in accordance with mode indication information carried by the parallel output signal, and the parallel output signal carries the mode indication information and input display data; and the data providing circuit is electrically connected to the serial-parallel conversion circuit, and is configured to convert the input display data into output display data and transmit the output display data to a corresponding data line under the control of the transmission control signal.

In a possible embodiment of the present disclosure, the parallel output signal further carries address data, and the driving module further includes an address processing circuit; and the address processing circuit is electrically connected to the serial-parallel conversion circuit and is configured to process the address data to obtain row number of the pixel circuits to be operated.

In a possible embodiment of the present disclosure, the driving module further includes a gate line selection circuit; the gate line selection circuit is configured to provide a gate driving signal to the gate line corresponding to the row number in accordance with the row number of the pixel circuits to be operated to control the pixel circuits corresponding to the row number to be operated.

In a possible embodiment of the present disclosure, the serial-parallel conversion circuit includes a serial-parallel conversion module, a mode conversion module and a common electrode voltage generation module; the serial-parallel conversion module is configured to convert the serial input signal into the parallel output signal; the mode conversion module is configured to generate the transmission control signal corresponding to a current display mode in accordance with the mode indication information carried by the parallel output signal, provide the transmission control signal and at least one bit of information in the mode indication information to the data providing circuit, and provide the mode indication information to the common electrode voltage generation module; and the common electrode voltage generation module is configured to generate a common electrode voltage, a first display control voltage and a second display control voltage corresponding to the current display mode in accordance with the mode indication information.

In a possible embodiment of the present disclosure, the address processing circuit includes an address latch module, an address decoding module and an address generation module; the address latch module is configured to latch the address data carried by the parallel output signal to obtain output address data; the address decoding module is electrically connected to the address latch module and is configured to decode the output address data to obtain decoded output address data; the address generation module is configured to process the decoded output address data to obtain the row number of the pixel circuits to be operated.

In a possible embodiment of the present disclosure, the data providing circuit includes a data transmission control module, a data transmission module and a data output module; the data transmission control module is configured to receive the transmission control signal and generate a transmission control clock signal corresponding to the current display mode in accordance with the transmission control signal and the at least one bit of information in the mode indication information; the data transmission module is configured to receive the input display data from the serial-parallel conversion module and convert the input display data in accordance with the transmission control clock signal to obtain an output display data group, and the output display data group includes at least one group of output display data; and the data output module is configured to receive the output display data group and transmit the output display data in the output display data group to the corresponding data line.

In a possible embodiment of the present disclosure, the serial-parallel conversion module includes an N-stage shift register, N data latches or delay latches (D latches) and M control multiplexing units; the serial input signal is applied to all input ends of the N D latches; where N is an integer greater than 1, and M is a positive integer; a chip selection signal is applied to a first input end of a first stage shift register, a system clock signal is applied to all second input ends of the N-stage shift register, an output end of the first stage shift register is electrically connected to a clock signal input end of a first D latch and a first input end of a second stage shift register, and the first stage shift register is configured to shift the chip selection signal under the control of the system clock signal to obtain a first output clock signal, and provide the first output clock signal to the clock signal input end of the first D latch; an output end of an a-th stage shift register is electrically connected to a first input end of an m-th control multiplexing unit, a second input end of the m-th control multiplexing unit is electrically connected to an output end of an N-th stage shift register, an output end of the m-th control multiplexing unit is electrically connected to a first input end of an (a+1)-th stage shift register, an m-th data bit control signal is applied to a control end of the m-th control multiplexing unit, the m-th control multiplexing unit is configured to control the output end of the a-th stage shift register of the output end of the N-th stage shift register to be connected to the first input end of the (a+1)-th stage shift register under the control of the m-th data bit control signal; the system clock signal is applied to a second input end of the (a+1)-th stage shift register, an output end of the (a+1)-th stage shift register is electrically connected to a clock signal input end of an (a+1)-th stage D latch, and the (a+1)-th stage shift register is configured to shift the signal output by the output end of the a-th stage shift register under the control of the system clock signal obtain an (a+1)-th output clock signal and provide the (a+1)-th output clock signal to the clock signal input end of the (a+1)-th stage D latch; a first input end of a b-th stage shift register is electrically connected to an output end of a (b−1)-th stage shift register, the system clock signal is applied to a second input end of the b-th stage shift register, an output end of the b-th stage shift register is electrically connected to a clock signal input end of a b-th stage D latch, and the b-th stage shift register is configured to shift the signal output from the output end of the (b−1)-th stage shift register to obtain a b-th output clock signal and provide the b-th output clock signal to the clock signal input end of the b-th stage D latch; where a is a positive integer, b is a positive integer greater than 1, and b−1 is not equal to a; m is a positive integer less than or equal to M, and M is a positive integer; and each D latch is configured to output corresponding data in the serial input signal under the control of the signal applied to the clock signal input end of the D latch.

In a possible embodiment of the present disclosure, the data providing circuit is configured to provide feedback signals to the M control multiplexing units after the output display data corresponding to the pixel circuits arranged in one row are all transmitted to corresponding data lines, and control the control multiplexing units to start operating after receiving the feedback signals.

In a possible embodiment of the present disclosure, the address latch module includes a first data flip-flop or delay flip-flop (D flip-flop), a second D flip-flop and an operational amplifier; the address data carried by the parallel output signal is applied to an input end of the first D flip-flop; an output end of the first D flip-flop is electrically connected to an input end of the second D flip-flop, an output end of the second D flip-flop is electrically connected to an input end of the operational amplifier, and the operational amplifier is configured to amplify data applied to the input end of the operational amplifier to obtain the output address data; and a first positive-phase latch control clock signal is applied to a first clock signal input end of the first D flip-flop, a first negative-phase latch control clock signal is applied to a second clock signal input end of the first D flip-flop, a second positive-phase latch control clock signal is applied to a first clock signal input end of the second D flip-flop; and a second negative-phase latch control clock signal is applied to a second clock signal input end of the second D flip-flop.

In a possible embodiment of the present disclosure, the address decoding module includes a plurality of decoders; the number of bits of the address data carried by the parallel output signals is P bits; the address latch module latches the address data with the P bits to obtain P-bit output address data; each decoder decodes at least two bits of the P-bit output address data respectively to obtain the decoded output address data; the address generation module is configured to process the decoded output address data obtained by the plurality of decoders respectively to obtain the row number of the pixel circuits to be operated.

In a possible embodiment of the present disclosure, the gate line selection circuit includes a plurality of gate line selection modules, and each gate line selection module corresponds to the pixel circuits arranged in one row; the address generation module is configured to generate a switch indication signal, provide the switch indication signal for indicating on to the gate line selection module corresponding to the pixel circuits in operation rows, and provide the switch indication signal for indicating off to the gate line selection module corresponding to the pixel circuits in non-operation rows; the gate line selection module includes a first inverter, a first transmission gate, a switch transistor, a first NAND gate, a second inverter, a third inverter, a fourth inverter and a fifth inverter; the switch indication signal is applied to an input end of the first inverter, and an output end of the first inverter is electrically connected to a gate electrode of the switch transistor; an input end of the first transmission gate is electrically connected to a transmission control end, an output end of the first transmission gate is electrically connected to a first input end of the first NAND gate; a positive-phase control end of the first transmission gate is electrically connected to the output end of the first inverter, a negative-phase control end of the first transmission gate is electrically connected to the input end of the first inverter, and the first transmission gate is configured to transmit the signal applied to the input end of the first transmission gate to the output end of the first transmission gate when a high-voltage signal is applied to the positive-phase control end of the first transmission gate; a second input end of the first NAND gate is electrically connected to a discharge control end, and a discharge control signal is applied to the discharge control end; an input end of the second inverter is electrically connected to an output end of the first NAND gate, an output end of the second inverter is electrically connected to an input end of the third inverter, an output end of the third inverter is electrically connected to an input end of the fourth inverter, and an output end of the fourth inverter is configured to provide a first gate driving signal to a corresponding row; and an input end of the fifth inverter is electrically connected to the output end of the second inverter, and an output end of the fifth inverter is configured to provide a second gate driving signal to a corresponding row.

In a possible embodiment of the present disclosure, the transmission control signal is applied to the transmission control end; and the data providing circuit is configured to provide the transmission control signal after a row of display data is transmitted.

In a possible embodiment of the present disclosure, the data transmission module includes a plurality of multiplexing units; and each multiplexing unit receives a corresponding transmission control clock signal and at least two bits of data in the input display data, and selects and outputs one bit of data in the at least two bits of data in accordance with the transmission control clock signal.

In a possible embodiment of the present disclosure, the data transmission module includes C groups of multiplexing units, and each group of multiplexing units includes D multiplexing units; where C and D are integers greater than 1; each row of input display data includes C input display data groups; and at least two bits of data in a e-th input display data group are applied to the D multiplexing units included in the c-th group of multiplexing units.

In a possible embodiment of the present disclosure, the driving module includes F serial-parallel conversion circuits and F data providing circuits; where F is an integer greater than 1, and f is a positive integer less than or equal to F; at least one of the F serial-parallel conversion circuits is configured to provide address data to the address processing circuit; at least one of the F serial-parallel conversion circuits is configured to provide a common electrode voltage corresponding to a current display mode; an f-th serial-parallel conversion circuit is electrically connected to an f-th data providing circuit, and is configured to output the input display data carried by the parallel output signal generated by the f-th serial-parallel conversion circuit to the f-th data providing circuit; and the f-th data providing circuit is configured to convert the input display data carried by the parallel output signal generated by the f-th serial-parallel conversion circuit to obtain f-th output display data and transmit the f-th output display data to a corresponding data line.

In a possible embodiment of the present disclosure, the driving module includes at least two address processing circuits, F serial-parallel conversion circuits and F data providing circuits; where F is an integer greater than 1, and f is a positive integer less than or equal to F; at least two of the F serial-parallel conversion circuits are configured to provide address data to corresponding address processing circuits respectively; at least one of the F serial-parallel conversion circuits is configured to provide a common electrode voltage corresponding to a current display mode; an f-th serial-parallel conversion circuit is electrically connected to an f-th data providing circuit, and is configured to output the input display data carried by the parallel output signal generated by the f-th serial-parallel conversion circuit to the f-th data providing circuit; and the f-th data providing circuit is configured to convert the input display data carried by the parallel output signal generated by the f-th serial-parallel conversion circuit to obtain f-th output display data and transmit the f-th output display data to a corresponding data line.

In a possible embodiment of the present disclosure, the driving module includes a gate driving circuit; the gate driving circuit is arranged in a peripheral region of the display panel; and the gate driving circuit is configured to generate a gate driving signal for driving the pixel circuits the pixel circuits corresponding to the row number to be operated in accordance with a driving input signal.

In another aspect, the present disclosure provides in some embodiments a display device, including a display panel and the above-mentioned driving module.

In a possible embodiment of the present disclosure, the display panel includes a plurality of pixel circuits arranged in rows and columns; each pixel circuit includes a first display control transmission gate, a second display control transmission gate, a third display control transmission gate and a latch ring; an input end of the first display control transmission gate is electrically connected to a data line, an output end of the first display control transmission gate is electrically connected to a negative-phase control end of the second display control transmission gate and a positive-phase control end of the third display control transmission gate, a positive-phase input end of the first display control transmission gate is electrically connected to a second gate line in a corresponding row, and a negative-phase input end of the first display control transmission gate is electrically connected to a first gate line in the corresponding row; an input end of the second display control transmission gate is electrically connected to a first display control voltage end, and an output end of the second display control transmission gate is electrically connected to a corresponding pixel electrode; an input end of the third display control transmission gate is electrically connected to a second display control voltage end, and an output end of the third display control transmission gate is electrically connected to the pixel electrode; and an input end of the latch ring is electrically connected to the positive-phase control end of the third display control transmission gate, and an output end of the latch ring is electrically connected to a negative-phase control end of the third display control transmission gate.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

All transistors adopted in the embodiments of the present disclosure may be thin film transistors (TFT), field effect transistors (FETs) or any other elements having an identical characteristic. In order to differentiate two electrodes other than a control electrode from each other, one of the two electrodes is called as first electrode and the other is called as second electrode.

In actual use, when the transistor is a TFT or FET, the first electrode may be a drain electrode and the second electrode may be a source electrode, or the first electrode may be a source electrode and the second electrode may be a drain electrode.

Figure 1:
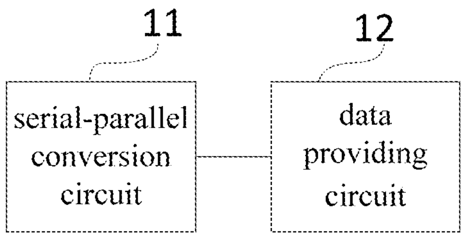
FIG. 1 is a schematic view showing a driving module according to one embodiment of the present disclosure.

In the embodiments of the present disclosure, a driving module is arranged in a display device, the display device includes a display panel, and the display panel includes a plurality of gate lines arranged in rows, a plurality of data lines arranged in columns and a plurality of pixel circuits arranged in rows and columns arranged in a display region. As shown in FIG. 1, the driving module includes a serial-parallel conversion circuit 11 and a data providing circuit 12.

The serial-parallel conversion circuit 11 is configured to convert a serial input signal into a parallel output signal and generate a transmission control signal and a common electrode voltage signal in accordance with mode indication information carried by the parallel output signal, and the parallel output signal carries the mode indication information and input display data.

The data providing circuit 12 is electrically connected to the serial-parallel conversion circuit 11, and is configured to convert the input display data into output display data and transmit the output display data to a corresponding data line under the control of the transmission control signal.

In the embodiments of the present disclosure, the driving module includes the serial-parallel conversion circuit 11 and the data providing circuit 12, the serial-parallel conversion circuit 11 is configured to convert the serial input signal into the parallel output signal, the parallel output signal carries the mode indication information and the input display data, the serial-parallel conversion circuit 11 generates the transmission control signal and the common electrode voltage signal in accordance with the mode indication information, and the data providing circuit 12 converts the input display data into the output display data and transmit the output display data to a corresponding data line under the control of the transmission control signal. It is able to achieve display through relying on serial input signals and other signals provided by a system without a display chip.

In the embodiments of the present disclosure, the driving module supports such display modes as a black-white display mode and an 8 color display mode, and the display mode is determined by the mode indication information.

In the embodiments of the present disclosure, the display device to which the driving module is applied may include a pixel circuit with Memory In Pixel (MIP) technology.

Figure 2:
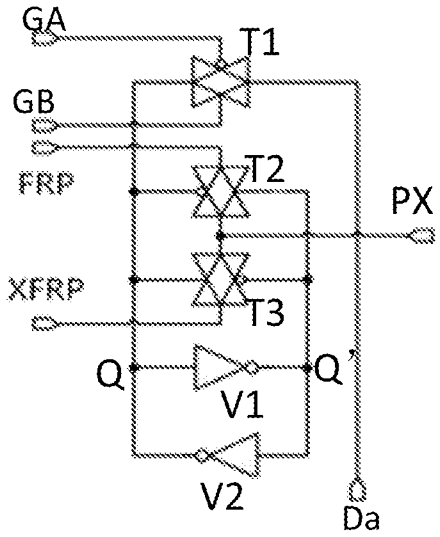
FIG. 2 is a circuit diagram of a pixel circuit according to one embodiment of the present disclosure.

As shown in FIG. 2, in a possible embodiment of the present disclosure, the pixel circuit includes a first display control transmission gate T1, a second display control transmission gate T2, a third display control transmission gate T3 and a latch ring, and the latch ring includes a first display control inverter V1 and a second display control inverter V2.

An input end of the first display control transmission gate T1 is electrically connected to a data line Da, an output end of the first display control transmission gate T1 is electrically connected to a negative-phase control end of the second display control transmission gate T2 and a positive-phase control end of the third display control transmission gate T3, a positive-phase input end of the first display control transmission gate T1 is electrically connected to a second gate line GB in a corresponding row, and a negative-phase input end of the first display control transmission gate T1 is electrically connected to a first gate line GA in the corresponding row.

An input end of the second display control transmission gate T2 is electrically connected to a first display control voltage end FRP, and an output end of the second display control transmission gate T2 is electrically connected to a corresponding pixel electrode PX.

An input end of the third display control transmission gate T3 is electrically connected to a second display control voltage end XFRP, and an output end of the third display control transmission gate T3 is electrically connected to the pixel electrode PX.

An input end of the first display control inverter V1 is electrically connected to the positive-phase control end of the third display control transmission gate T3, and an output end of the first display control inverter V1 is electrically connected to a negative-phase control end of the third display control transmission gate T3.

An input end of the second display control inverter V2 is electrically connected to the output end of the first display control inverter V1, and an output end of the second display control inverter V2 is electrically connected to the input end of the first display control inverter V1.

The input end of V1 is electrically connected to a first node Q, and the output end of V1 is electrically connected to a second node Q'.

As shown in FIG. 2, in a possible embodiment of the present disclosure, a first gate driving signal provided by GA is out-of-phase with a second gate driving signal provided by GB, i.e., when GA provides a high voltage signal, GB provides a low voltage signal, and when GA provides a low voltage signal, GB provides a high voltage signal.

When GA provides a low voltage signal and GB provides a high voltage signal, a data voltage provided by the data line Da enters the latch loop formed by V1 and V2 through the first display control transmission gate T1, then GA provides a high voltage signal, GB provides a low voltage signal, and T1 is turned off.

When the data voltage provided by Da is a low voltage signal, T2 is turned on, the first display control voltage provided by FRP is transmitted to the pixel electrode PX through T2; and when the data voltage provided by Da is a high voltage signal, T3 is turned on, and the second display control voltage provided by XFRP is transmitted to the pixel electrode PX through T3; until T1 is turned on again.

As shown in FIG. 2, in a possible embodiment of the present disclosure, the pixel circuit only has two states of a high level and a low level during an operation, so as to achieve an extremely low refreshing frequency, thereby to reduce the power consumption.

In the related art, a refreshing frequency of the pixel circuit with the MIP technology may be as low as 1 Hz.

In the pixel circuit shown in FIG. 2, when a high voltage signal is applied to a positive-phase control end of a display control transmission gate and a low voltage signal is applied to a negative-phase control end of a display control transmission gate, the display control transmission gate is turned on to transmit the signal applied to the input end of the display control transmission gate to the output end thereof.

In a possible embodiment of the present disclosure, the parallel output signal further carries address data, and the driving module further includes an address processing circuit; and the address processing circuit is electrically connected to the serial-parallel conversion circuit and is configured to process the address data to obtain row number of the pixel circuits to be operated.

During the implementation, the serial-parallel conversion circuit obtains the parallel output signal through conversion and carries the address data, the driving module includes the address processing circuit which processes the address data to obtain the row number of the pixel circuits to be operated.

Figure 3:
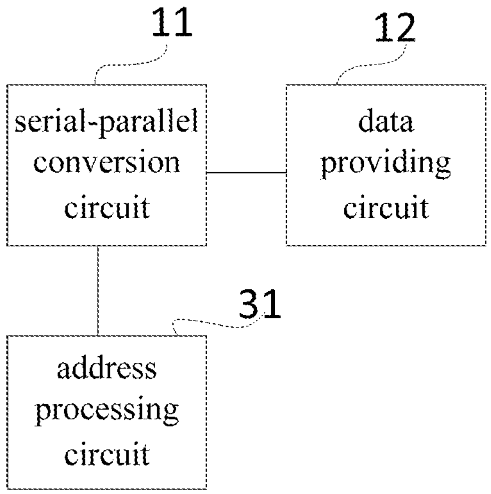
FIG. 3 is another schematic view showing the driving module according to one embodiment of the present disclosure.

As shown in FIG. 3, according to the pixel circuit in FIG. 1, the parallel output signal further carries address data, and the driving module further includes an address processing circuit 31; and the address processing circuit 31 is electrically connected to the serial-parallel conversion circuit 11 and is configured to process the address data to obtain row number of the pixel circuits to be operated.

In a possible embodiment of the present disclosure, a serial input signal corresponding to the pixel circuits arranged in one row may include 13 groups of serial input data; in the first group of serial input data, the first 6 bits are mode bits to determine the display mode, and the next 10 bits are address bits to determine the address of opened gate lines; and in the second group of serial input data to the thirteenth group of serial data, there are multi-bit display data bits that determine the data voltage to be written to the pixel circuits arranged in the row.

The above structure of the serial input signal corresponding to the pixel circuits arranged in one row is only for example, and in actual operation, there are other structures of the serial input data corresponding to the pixel circuits arranged in one TOW.

Figure 4:
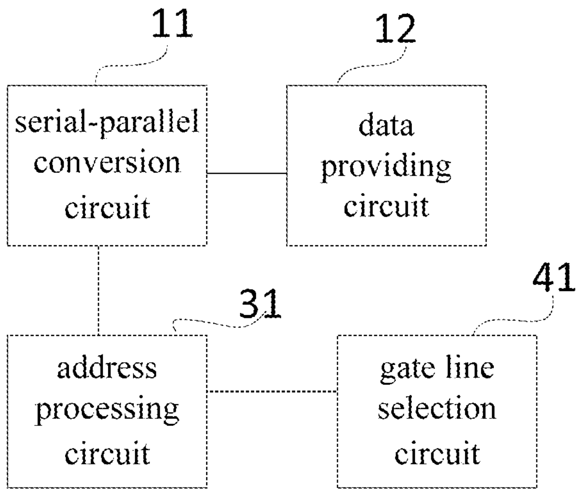
FIG. 4 is yet another schematic view showing the driving module according to one embodiment of the present disclosure.

As shown in FIG. 4, according to the driving module in FIG. 3, the driving module in a possible embodiment of the present disclosure further includes a gate line selection circuit 41; the gate line selection circuit 41 is electrically connected to the address processing circuit 31, and is configured to provide a gate driving signal to the gate line corresponding to the row number in accordance with the row number of the pixel circuits to be operated to control the pixel circuits corresponding to the row number to be operated.

Optionally, the serial-parallel conversion circuit includes a serial-parallel conversion module, a mode conversion module and a common electrode voltage generation module; the serial-parallel conversion module is configured to convert the serial input signal into the parallel output signal; the mode conversion module is configured to generate the transmission control signal corresponding to a current display mode in accordance with the mode indication information carried by the parallel output signal, provide the transmission control signal and at least one bit of information in the mode indication information to the data providing circuit, and provide the mode indication information to the common electrode voltage generation module; and the common electrode voltage generation module is configured to generate a common electrode voltage, a first display control voltage and a second display control voltage corresponding to the current display mode in accordance with the mode indication information.

During the implementation, the serial-parallel conversion circuit includes the serial-parallel conversion module, the mode conversion module and the common electrode voltage generation module; the serial-parallel conversion module converts the serial input signal into the parallel output signal; the mode conversion module generates the transmission control signal in accordance with the mode indication information carried by the parallel output signal, and the common electrode voltage generation module generates the common electrode voltage Vcom, the first display control voltage and the second display control voltage corresponding to the current display mode in accordance with the mode indication information.

In a possible embodiment of the present disclosure, in different display modes, the common electrode voltage Vcom, may be different from the first display control voltage or the second display control voltage, the common electrode voltage Vcom may be, but not limited to, in-phase with the first display control voltage, or the common electrode voltage Vcom may be, but not limited to, in-phase with the second display control voltage.

Figure 5:
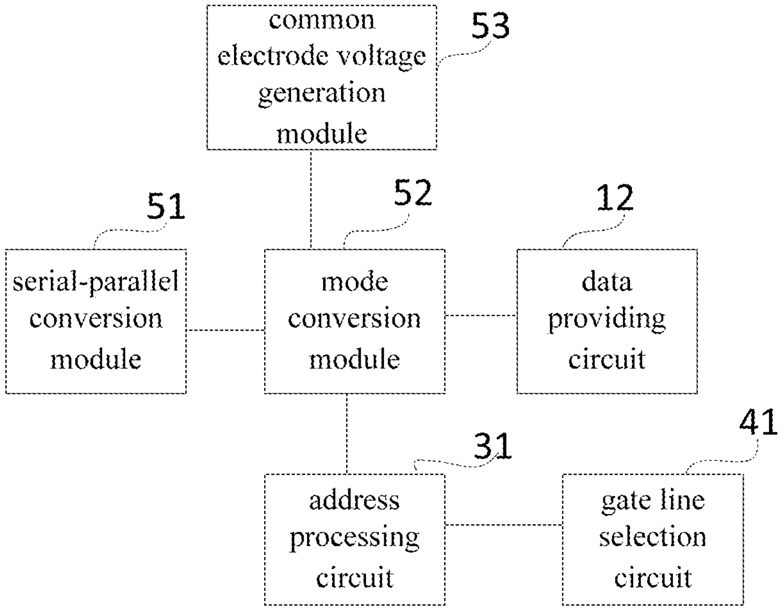
FIG. 5 is still yet another schematic view showing the driving module according to one embodiment of the present disclosure.

As shown in FIG. 5, according to the driving module in FIG. 4, the serial-parallel conversion circuit includes a serial-parallel conversion module 51, a mode conversion module 52 and a common electrode voltage generation module 53; the serial-parallel conversion module 51 is configured to convert the serial input signal into the parallel output signal; the mode conversion module 52 is electrically connected to the serial-parallel conversion module 51 and is configured to generate the transmission control signal corresponding to a current display mode in accordance with the mode indication information carried by the parallel output signal, provide the transmission control signal and at least one bit of information in the mode indication information to the data providing circuit 12, and provide the mode indication information to the common electrode voltage generation module 53; and the common electrode voltage generation module 53 is configured to generate a common electrode voltage, a first display control voltage and a second display control voltage corresponding to the current display mode in accordance with the mode indication information.

In a possible embodiment of the present disclosure, the address processing circuit includes an address latch module, an address decoding module and an address generation module; the address latch module is configured to latch the address data carried by the parallel output signal to obtain output address data; the address decoding module is electrically connected to the address latch module and is configured to decode the output address data to obtain decoded output address data; the address generation module is configured to process the decoded output address data to obtain the row number of the pixel circuits to be operated.

During the implementation, the address processing circuit may include an address latch module, an address decoding module and an address generation module, the address latch module latches the address data carried by the parallel output signal to obtain output address data, the address decoding module decodes the output address data, and the address generation module processes the decoded output address data.

Figure 6A:
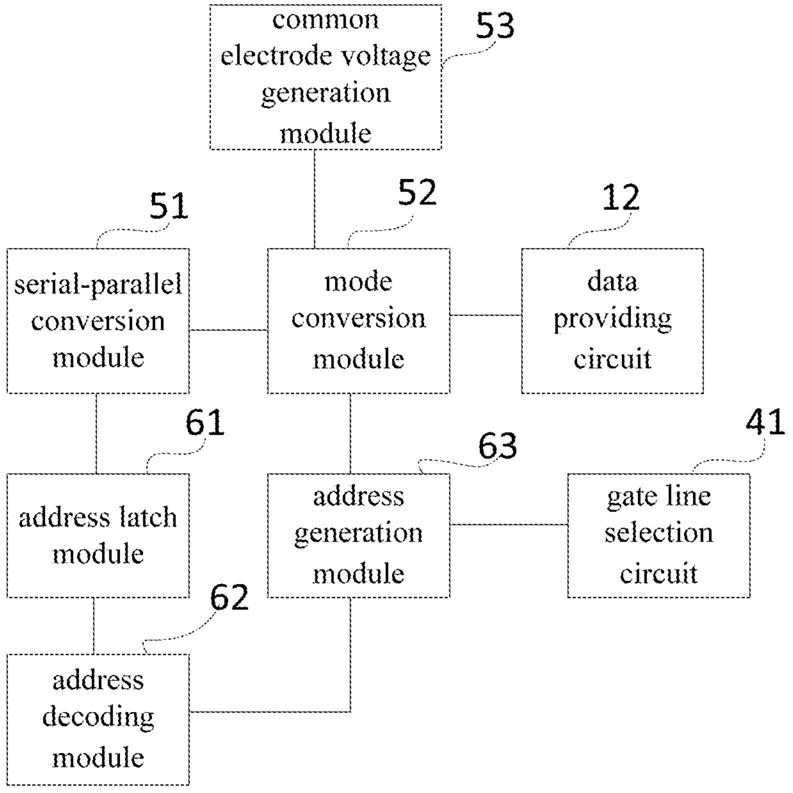
FIG. 6A is still yet another schematic view showing the driving module according to one embodiment of the present disclosure.

As shown in FIG. 6A, according to the driving module in FIG. 5, the address processing circuit includes an address latch module 61, an address decoding module 62 and an address generation module 63; the address latch module 61 is electrically connected to the serial-parallel conversion module 51 and is configured to latch the address data carried by the parallel output signal to obtain output address data;

the address decoding module 62 is electrically connected to the address latch module 61 and is configured to decode the output address data to obtain decoded output address data; and the address generation module 63 is electrically connected to the address decoding module 62 and is configured to process the decoded output address data to obtain the row number of the pixel circuits to be operated.

Figure 6B:
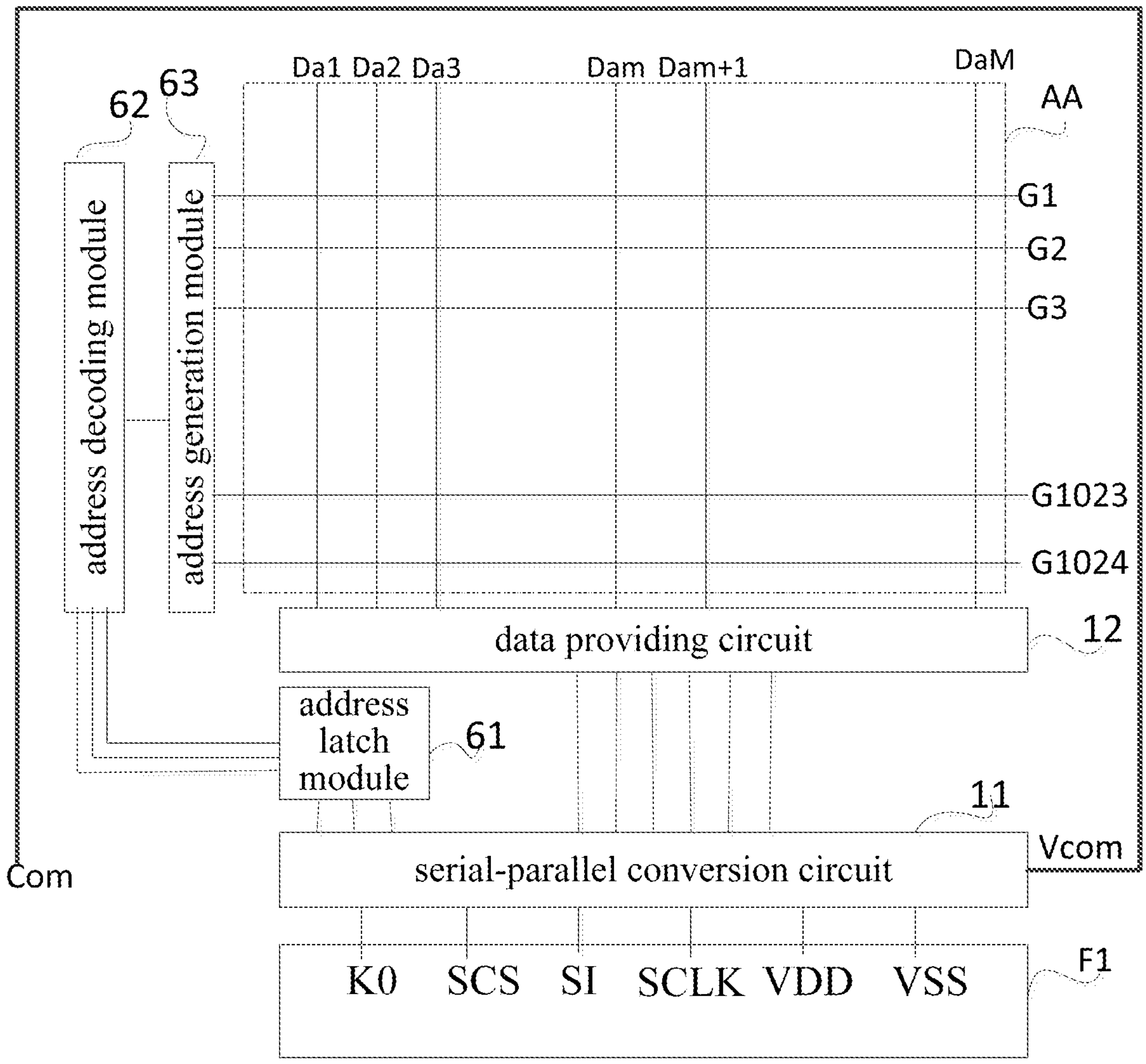
FIG. 6B is a schematic view showing a display device according to one embodiment of the present disclosure.

As shown in FIG. 6B, G1 denotes a gate line arranged in a first row, G2 denotes a gate line arranged in a second row, G3 denotes a gate line arranged in a third row, G1023 denotes a gate line arranged in a 1023rd row, and G1024 denotes a gate line arranged in a 1024rd row.

Figure 12:
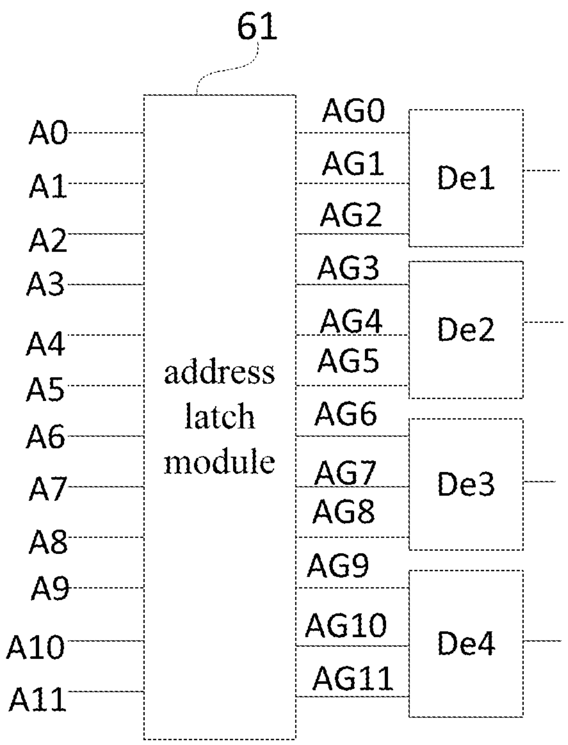
FIG. 12 is another schematic view showing the address processing circuit according to one embodiment of the present disclosure.

In FIG. 6B, 12 denotes the data providing circuit, and 11 denotes the serial-parallel conversion circuit.

In FIG. 6B, Da1 denotes a data line arranged in a first column, Da2 denotes a data line arranged in a second column, Da3 denotes a data line arranged in a third column, Dam denotes a data line arranged in an m-th column, Dam+1 denotes a data line arranged in an (m+1)-th column, and DaM denotes a data line arranged in an M-th column, where both m and M are positive integers.

In FIG. 6B, 61 denotes the address latch module, 62 denotes the address decoding module, 63 denotes the address generation module, Vcom denotes the common electrode voltage generated by the serial-parallel conversion circuit 11, and AA denotes a valid display region of the display panel. The serial-parallel conversion circuit 11 generates the common electrode voltage Vcom and transmits the common electrode voltage Vcom to a common electrode voltage line Com.

In FIG. 6B, K0 denotes a switch signal, SCS denotes a chip selection signal, SCLK denotes a system clock signal, SI denotes a serial input signal, VDD denotes a high voltage signal, and VSS denotes a low voltage signal; K0, SCS, SCLK, SI, VDD, and VSS may all be provided by a chip F1, and F1 may be a flexible circuit board (FPC).

Figure 6C:
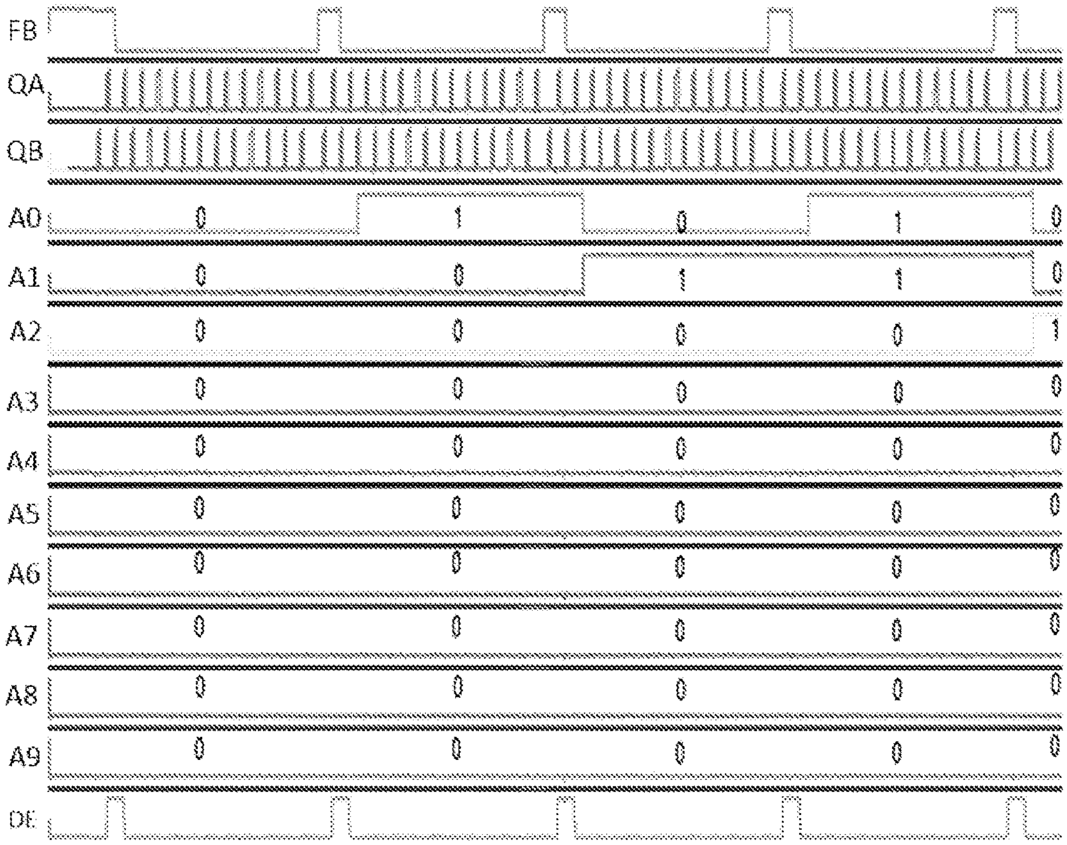
FIG. 6C is a simulation sequence diagram of address data in an address latch module.

FIG. 6C shows a simulation sequence diagram of the address data in the address latch module.

In FIG. 6C, FB denotes a feedback signal, DE denotes a data enable signal, DE is provided by the address processing circuit, and FB is provided by the data providing circuit.

Optionally, the data providing circuit includes a data transmission control module, a data transmission module and a data output module; the data transmission control module is configured to receive the transmission control signal and generate a transmission control clock signal corresponding to the current display mode in accordance with the transmission control signal and the at least one bit of information in the mode indication information; the data transmission module is configured to receive the input display data from the serial-parallel conversion module and convert the input display data in accordance with the transmission control clock signal to obtain an output display data group, and the output display data group includes at least one group of output display data; and the data output module is configured to receive the output display data group and transmit the output display data in the output display data group to the corresponding data line.

During the implementation, the data providing circuit includes the data transmission control module, the data transmission module and the data output module; the data transmission control module generates the transmission control clock signal corresponding to the current display mode in accordance with the transmission control signal provided by the mode conversion module and the at least one bit of information in the mode indication information, the data transmission module converts the input display data in accordance with the transmission control clock signal to obtain an output display data group, and the data output module transmits the output display data in the output display data group to the corresponding data line.

Figure 7:
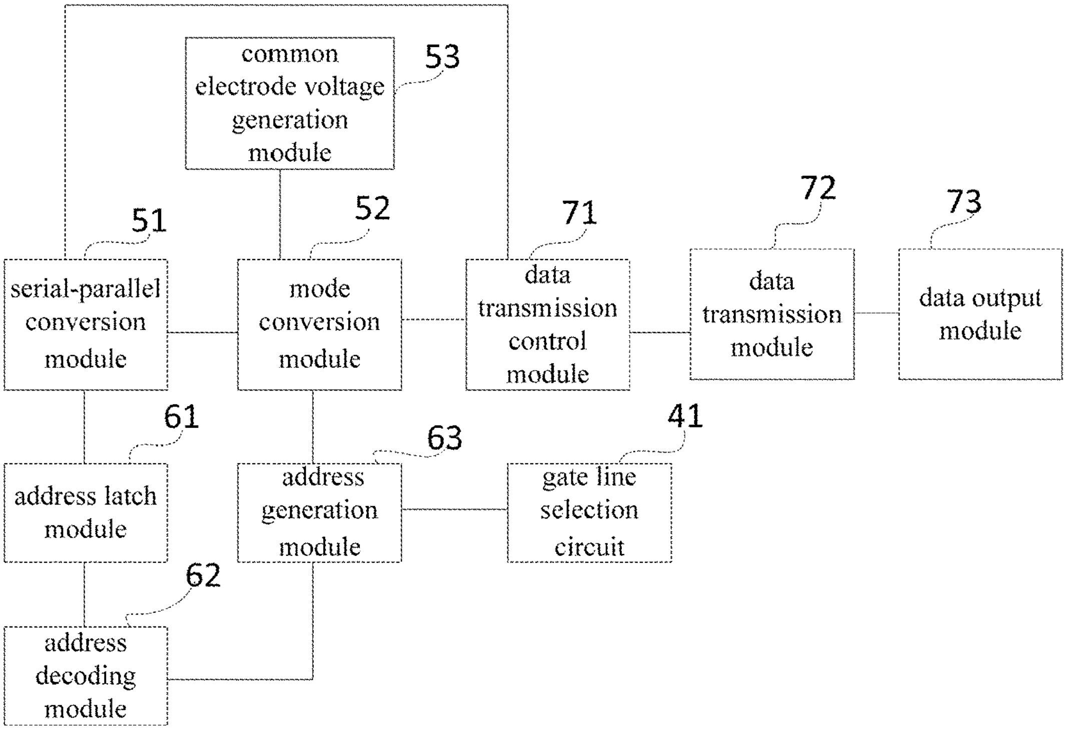
FIG. 7 is still yet another schematic view showing the driving module according to one embodiment of the present disclosure.

As shown in FIG. 7, according to the driving module in FIG. 6A, the data providing circuit includes a data transmission control module 71, a data transmission module 72 and a data output module 73; the data transmission control module 71 is electrically connected to the mode conversion module 52, and is configured to receive the transmission control signal and generate a transmission control clock signal corresponding to the current display mode in accordance with the transmission control signal and the at least one bit of information in the mode indication information; the data transmission module 72 is electrically connected to the serial-parallel conversion module 51 and the data transmission control module 71, and is configured to receive the input display data from the serial-parallel conversion module 51 and convert the input display data in accordance with the transmission control clock signal provided by the data transmission control module 71 to obtain an output display data group, and the output display data group includes at least one group of output display data; and the data output module 73 is electrically connected to the data transmission module 72, and is configured to receive the output display data group and transmit the output display data in the output display data group to the corresponding data line.

In a possible embodiment of the present disclosure, the serial-parallel conversion module includes an N-stage shift register, N D latches and M control multiplexing units; the serial input signal is applied to all input ends of the N D latches; where N is an integer greater than 1, and M is a positive integer; a chip selection signal is applied to a first input end of a first stage shift register, a system clock signal is applied to all second input ends of the N-stage shift register, an output end of the first stage shift register is electrically connected to a clock signal input end of a first D latch and a first input end of a second stage shift register, and the first stage shift register is configured to shift the chip selection signal under the control of the system clock signal to obtain a first output clock signal, and provide the first output clock signal to the clock signal input end of the first D latch; an output end of an a-th stage shift register is electrically connected to a first input end of an m-th control multiplexing unit, a second input end of the m-th control multiplexing unit is electrically connected to an output end of an N-th stage shift register, an output end of the m-th control multiplexing unit is electrically connected to a first input end of an (a+1)-th stage shift register, an m-th data bit control signal is applied to a control end of the m-th control multiplexing unit, the m-th control multiplexing unit is configured to control the output end of the a-th stage shift register or the output end of the N-th stage shift register to be connected to the first input end of the (a+1)-th stage shift register under the control of the m-th data bit control signal; the system clock signal is applied to a second input end of the (a+1)-th stage shift register, an output end of the (a+1)-th stage shift register is electrically connected to a clock signal input end of an (a+1)-th stage D latch, and the (a+1)-th stage shift register is configured to shift the signal output by the output end of the a-th stage shift register under the control of the system clock signal obtain an (a+1)-th output clock signal and provide the (a+1)-th output clock signal to the clock signal input end of the (a+1)-th stage D latch; a first input end of a b-th stage shift register is electrically connected to an output end of a (b−1)-th stage shift register, the system clock signal is applied to a second input end of the b-th stage shift register, an output end of the b-th stage shift register is electrically connected to a clock signal input end of a b-th stage D latch, and the b-th stage shift register is configured to shift the signal output from the output end of the (b−1)-th stage shift register to obtain a b-th output clock signal and provide the b-th output clock signal to the clock signal input end of the b-th stage D latch; where a is a positive integer, b is a positive integer greater than 1, and b−1 is not equal to a; m is a positive integer less than or equal to M, and M is a positive integer, and each D latch is configured to output corresponding data in the serial input signal under the control of the signal applied to the clock signal input end of the D latch.

In a possible embodiment of the present disclosure, the data providing circuit is configured to provide feedback signals to the M control multiplexing units after the output display data corresponding to the pixel circuits arranged in one row are all transmitted to corresponding data lines, and control the control multiplexing units to start operating after receiving the feedback signals.

Figure 8:
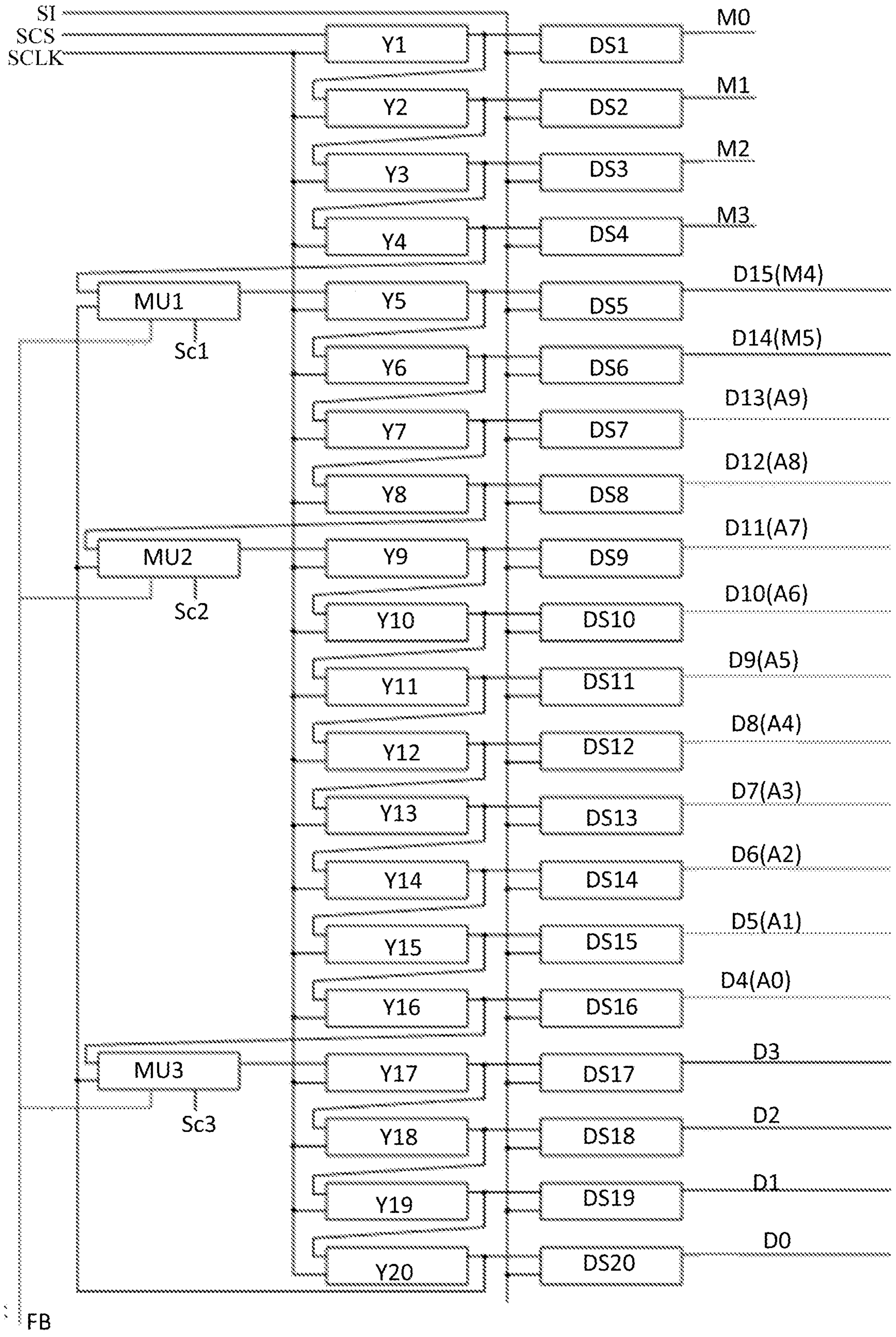
FIG. 8 is a schematic view showing a serial-parallel conversion module according to one embodiment of the present disclosure.

As shown in FIG. 8, the serial-parallel conversion module may include a 20-stages shift register, 20 D latches and three control multiplexing units, the serial input signal SI is applied to all the input ends of the 20 D latches.

In FIG. 8, Y1 denotes a first shift register, Y2 denotes a second shift register, Y3 denotes a third shift register, Y4 denotes a fourth shift register, Y5 denotes a fifth shift register, Y6 denotes a sixth shift register, Y7 denotes a seventh shift register, Y8 denotes an eighth shift register, Y9 denotes a ninth shift register, Y10 denotes a tenth shift register, Y11 denotes an eleventh shift register, Y12 denotes a twelfth shift register, Y13 denotes a thirteenth shift register, Y14 denotes a fourteenth shift register, Y15 denotes a fifteenth shift register, Y16 denotes a sixteenth shift register, Y17 denotes a seventeenth shift register, Y18 denotes an eighteenth shift register, Y19 denotes a nineteenth shift register, and Y20 denotes a twentieth shift register.

DS1 denotes a first D latch, DS2 denotes a second D latch, DS3 denotes a third D latch, DS4 denotes a fourth D latch, DS5 denotes a fifth D latch, DS6 denotes a sixth D latch, DS7 denotes a seventh D latch, DS8 denotes an eighth D latch, DS9 denotes a ninth D latch, DS10 denotes a tenth D latch, DS11 denotes an eleventh D latch, DS12 denotes a twelfth D latch, DS13 denotes a thirteenth D latch, DS14 denotes a fourteenth D latch, DS15 denotes a fifteenth D latch, DS16 denotes a sixteenth D latch, DS17 denotes a seventeenth, DS18 denotes an eighteenth D latch, DS19 denotes a nineteenth D latch, and DS20 denotes a twentieth D latch.

MU1 denotes a first control multiplexing unit, MU2 denotes a second control multiplexing unit, and MU3 denotes a third control multiplexing unit.

The chip selection signal SCS is applied to a first input end of Y1, the system clock signal SCLK is applied to a second input end of Y1, an output end of Y1 is electrically connected to a first input end of Y2, the output end of Y1 is electrically connected to a clock signal input end of DS1, the serial input signal SI is applied to an input end of DS1, and a first mode indication bit M0 is output through an output end of DS1.

The system clock signal SCLK is applied to a second input end of Y2, an output end of Y2 is electrically connected to a first input end of Y3, the output end of Y2 is electrically connected to a clock signal input end of DS2, the serial input signal SI is applied to an input end of DS2, and a second mode indication bit M1 is output through an output end of DS2.

The system clock signal SCLK is applied to a second input end of Y3, an output end of Y3 is electrically connected to a first input end of Y4, the output end of Y3 is electrically connected to a clock signal input end of DS3, the serial input signal SI is applied to an input end of DS3, and a third mode indication bit M2 is output through an output end of DS3.

The system clock signal SCLK is applied to a second input end of Y4, an output end of Y4 is electrically connected to a first input end of Y5, the output end of Y4 is electrically connected to a clock signal input end of DS4, the serial input signal SI is applied to an input end of DS4, and a fourth mode indication bit M3 is output through an output end of DS4. (关于 Y4, 中文稿中有 一段重复的)

The system clock signal SCLK is applied to a second input end of Y5, an output end of Y5 is electrically connected to a first input end of Y6, the output end of Y5 is electrically connected to a clock signal input end of DS5, the serial input signal SI is applied to an input end of DS5, and a sixteenth display data bit D15 or a fifth mode indication bit M4 is output through an output end of DS5.

The system clock signal SCLK is applied to a second input end of Y6, an output end of Y6 is electrically connected to a first input end of Y7, the output end of Y6 is electrically connected to a clock signal input end of DS6, the serial input signal SI is applied to an input end of DS6, and a fifteenth display data bit D14 or a sixth mode indication bit M5 is output through an output end of DS6.

The system clock signal SCLK is applied to a second input end of Y7, an output end of Y7 is electrically connected to a first input end of Y8, the output end of Y7 is electrically connected to a clock signal input end of DS7, the serial input signal SI is applied to an input end of DS7, and a fourteenth display data bit D13 or a tenth address data bit A9 is output through an output end of DS7.

The system clock signal SCLK is applied to a second input end of Y8, an output end of Y8 is electrically connected to a first input end of Y9, the output end of Y8 is electrically connected to a clock signal input end of DS8, the serial input signal SI is applied to an input end of DS8, and a thirteenth display data bit D12 or a ninth address data bit A8 is output through an output end of DS8.

The system clock signal SCLK is applied to a second input end of Y9, an output end of Y9 is electrically connected to a first input end of Y10, the output end of Y9 is electrically connected to a clock signal input end of DS9, the serial input signal SI is applied to an input end of DS9, and a twelfth display data bit D11 or an eighth address data bit A7 is output through an output end of DS9.

The system clock signal SCLK is applied to a second input end of Y10, an output end of Y10 is electrically connected to a first input end of Y11, the output end of Y10 is electrically connected to a clock signal input end of DS10, the serial input signal SI is applied to an input end of DS10, and an eleventh display data bit D10 or a seventh address data bit A6 is output through an output end of DS10.

The system clock signal SCLK is applied to a second input end of Y11, an output end of Y11 is electrically connected to a first input end of Y12, the output end of Y11 is electrically connected to a clock signal input end of DS11, the serial input signal SI is applied to an input end of DS11, and a tenth display data bit D9 or a sixth address data bit A5 is output through an output end of DS11.

The system clock signal SCLK is applied to a second input end of Y12, an output end of Y12 is electrically connected to a first input end of Y13, the output end of Y12 is electrically connected to a clock signal input end of DS12, the serial input signal SI is applied to an input end of DS12, and a ninth display data bit D8 or a fifth address data bit A4 is output through an output end of DS12.

The system clock signal SCLK is applied to a second input end of Y13, an output end of Y13 is electrically connected to a first input end of Y14, the output end of Y13 is electrically connected to a clock signal input end of DS13, the serial input signal SI is applied to an input end of DS13, and an eighth display data bit D7 or a fourth address data bit A3 is output through an output end of DS13.

The system clock signal SCLK is applied to a second input end of Y14, an output end of Y14 is electrically connected to a first input end of Y15, the output end of Y14 is electrically connected to a clock signal input end of DS14, the serial input signal SI is applied to an input end of DS14, and a seventh display data bit D6 or a third address data bit A2 is output through an output end of DS14.

The system clock signal SCLK is applied to a second input end of Y15, an output end of Y15 is electrically connected to a first input end of Y16, the output end of Y15 is electrically connected to a clock signal input end of DS15, the serial input signal SI is applied to an input end of DS15, and a sixth display data bit D5 or a second address data bit A1 is output through an output end of DS15.

The system clock signal SCLK is applied to a second input end of Y16, an output end of Y16 is electrically connected to a first input end of Y17, the output end of Y16 is electrically connected to a clock signal input end of DS16, the serial input signal SI is applied to an input end of DS16, and a fifth display data bit D4 or a first address data bit A0 is output through an output end of DS16.

The system clock signal SCLK is applied to a second input end of Y17, an output end of Y17 is electrically connected to a first input end of Y18, the output end of Y17 is electrically connected to a clock signal input end of DS17, the serial input signal SI is applied to an input end of DS17, and a fourth display data bit D3 is output through an output end of DS17.

The system clock signal SCLK is applied to a second input end of Y18, an output end of Y18 is electrically connected to a first input end of Y19, the output end of Y18 is electrically connected to a clock signal input end of DS18, the serial input signal SI is applied to an input end of DS18, and a third display data bit D2 is output through an output end of DS18.

The system clock signal SCLK is applied to a second input end of Y19, an output end of Y19 is electrically connected to a first input end of Y20, the output end of Y19 is electrically connected to a clock signal input end of DS19, the serial input signal SI is applied to an input end of DS19, and a second display data bit D1 is output through an output end of DS19.

The system clock signal SCLK is applied to a second input end of Y20, an output end of Y20 is electrically connected to a clock signal input end of DS20, the serial input signal SI is applied to an input end of DS20, and a first display data bit DO is output through an output end of DS20.

A first input end of MU1 is electrically connected to the output end of Y4, a second input end of MU1 is electrically connected to the output end of Y20, a first data bit control signal Sol is applied to a first control end of MU1, and the feedback signal FB is applied to a second control end of MU1.

A first input end of MU2 is electrically connected to the output end of Y8, a second input end of MU2 is electrically connected to the output end of Y20, a second data bit control signal Se2 is applied to a first control end of MU2, and the feedback signal FB is applied to a second control end of MU2.

A first input end of MU3 is electrically connected to the output end of Y16, a second input end of MU3 is electrically connected to the output end of Y20, a third data bit control signal Se3 is applied to a first control end of MU3, and the feedback signal FB is applied to a second control end of MU3.

In a possible embodiment of the present disclosure, each data bit control signal may be provided by the mode conversion module.

In a possible embodiment of the present disclosure, during an operation shown in FIG. 8, the data providing circuit provides feedback signals FB to MU1, MU2 and MU3 after the output display data corresponding to the pixel circuits arranged in one row are all transmitted to corresponding data lines, and control MU1, MU2 and MU3 to start operating.

A serial input signal corresponding to the pixel circuits arranged in one row may include 13 groups of serial input data.

When the first group of serial input data is converted, MU1 controls the output end of Y4 to be connected to the input end of Y5, MU2 controls the output end of Y8 to be connected to the input end of Y9, and MU3 controls the output end of Y16 to be connected to the input end of Y17, so as to control DS1-DS6 to output six mode indication bits, and control DS7-DS16 to output ten mode indication bits.

When the next twelve groups of serial input data are converted, it is able to choose to transmit 16-bit display data, 12-bit display data or 4-bit display data through a valid control signal among Se1, Se2 and Se3.

When Se1 is valid, MU1 controls the output end of Y20 to be connected to the input end of Y5 to control DS5-DS20 to output 16-bit display data in sequence; when Sc2 is valid, MU2 controls the output end of Y20 to be connected to the input end of Y9 to control D9-D20 to output 12-bit display data in sequence; and when Sc3 is valid, MU3 controls the output end of Y20 to be connected to the input end of Y17 to control D17-D20 to output 4-bit display data in sequence.

Figure 9:
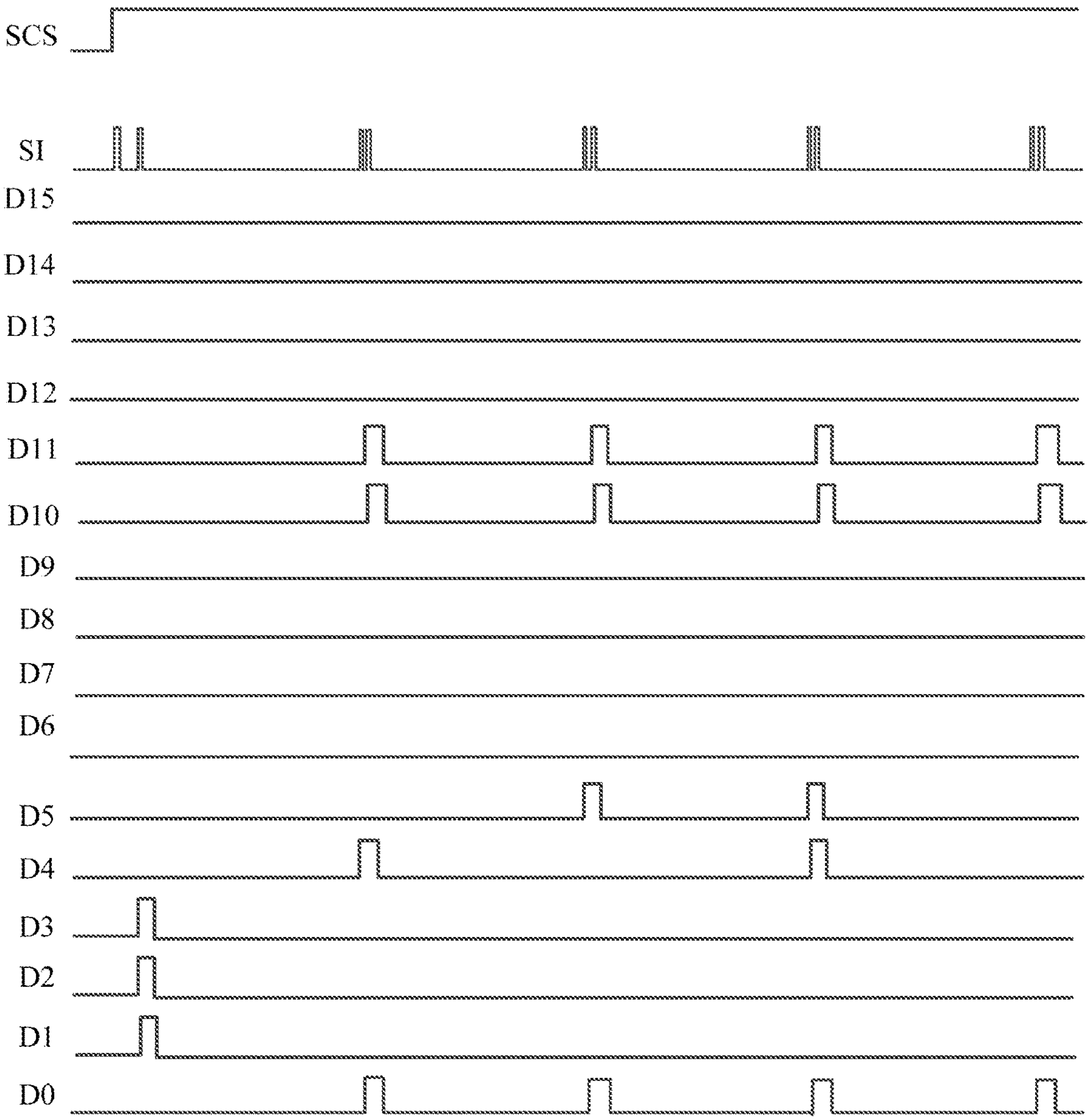
FIG. 9 is a simulation sequence diagram of converting a serial input signal into 16-channel display data during an operation of the serial-parallel conversion module according to one embodiment of the present disclosure.

FIG. 9 shows a simulation sequence diagram of converting a serial input signal into 16-channel display data during an operation of the serial-parallel conversion module shown in FIG. 8.

In a possible embodiment of the present disclosure, the address latch module includes a first D flip-flop, a second D flip-flop and an operational amplifier; the address data carried by the parallel output signal is applied to an input end of the first D flip-flop; an output end of the first D flip-flop is electrically connected to an input end of the second D flip-flop, an output end of the second D flip-flop is electrically connected to an input end of the operational amplifier, and the operational amplifier is configured to amplify data applied to the input end of the operational amplifier to obtain the output address data; and a first positive-phase latch control clock signal is applied to a first clock signal input end of the first D flip-flop, a first negative-phase latch control clock signal is applied to a second clock signal input end of the first D flip-flop, a second positive-phase latch control clock signal is applied to a first clock signal input end of the second D flip-flop; and a second negative-phase latch control clock signal is applied to a second clock signal input end of the second D flip-flop.

Figure 10:
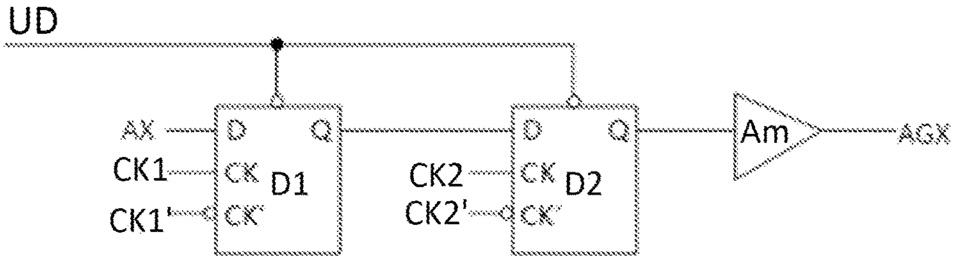
FIG. 10 is a schematic view showing an address latch module according to one embodiment of the present disclosure.

As shown in FIG. 10, in a possible embodiment of the present disclosure, the address latch module includes a first D flip-flop D1, a second D flip-flop D2 and an operational amplifier Am.

The address data AX carried by the parallel output signal is applied to an input end of the first D flip-flop D1; an output end of the first D flip-flop D1 is electrically connected to an input end of the second D flip-flop D2, an output end of the second D flip-flop D2 is electrically connected to an input end of the operational amplifier Am, and the operational amplifier Am is configured to amplify data applied to the input end of the operational amplifier Am to obtain the output address data.

A first positive-phase latch control clock signal CK1 is applied to a first clock signal input end of the first D flip-flop D1, a first negative-phase latch control clock signal CK1' is applied to a second clock signal input end of the first D flip-flop D1, a second positive-phase latch control clock signal CK2 is applied to a first clock signal input end of the second D flip-flop D2; and a second negative-phase latch control clock signal CK2' is applied to a second clock signal input end of the second D flip-flop D2.

Both a control end of D1 and a control end of D2 are applied to an update control signal UD.

In a possible embodiment of the present disclosure, during an operation of the address latch module shown in FIG. 10, when a potential at CK1 is a high voltage, and a potential at CK1' is a low voltage, AX is transmitted to the input end of D2; and when a potential at CK2 is a high voltage, and a potential at CK2' is a low voltage, AX is transmitted to the input end of Am, and Am amplifies AX to obtain the output address data AGX.

In a possible embodiment of the present disclosure, the address decoding module includes a plurality of decoders; the number of bits of the address data carried by the parallel output signals is P bits; the address latch module latches the address data with the P bits to obtain P-bit output address data; each decoder decodes at least two bits of the P-bit output address data respectively to obtain the decoded output address data; the address generation module is configured to process the decoded output address data obtained by the plurality of decoders respectively to obtain the row number of the pixel circuits to be operated.

Figure 11:
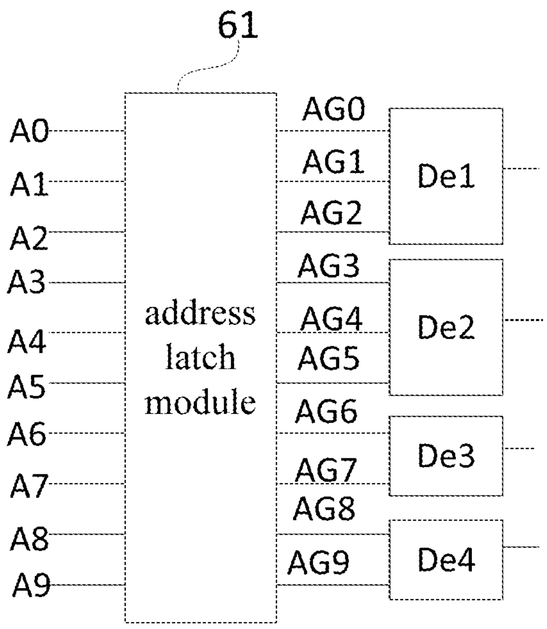
FIG. 11 is a schematic view showing an address processing circuit according to one embodiment of the present disclosure.

As shown in FIG. 11, when the number of bits of the address data carried by the parallel output signals is 10 bits, A0, A1, A2, A3, A4, A5, A6, A7, A8 and A9 denote the first bit address data, the second bit address data, the third bit address data, the fourth bit address data, the fifth bit address data, the sixth bit address data, the seventh bit address data, the eighth bit address data, the ninth bit address data and the tenth bit address data, respectively.

The address latch module 61 converts the 10-bit address data into 10-bit output address data, AG0 denotes the first bit output address data, AG1 denotes the second bit output address data, AG2 denotes the third bit output address data, AG3 denotes the fourth bit output address data, AG4 denotes the fifth bit output address data, AG5 denotes the sixth bit output address data, AG6 denotes the seventh bit output address data, AG7 denotes the eighth bit output address data, AG8 denotes the ninth bit output address data, and AG9 denotes the tenth bit output address data.

The address decoding module may include two 3-8 decoders and two 2-4 decoders.

In FIG. 11, De1 denotes a first 3-8 decoder, De2 denotes a second 3-8 decoder, De3 denotes a first 2-4 decoder, and De4 denotes a second 2-4 decoder; De1 is used to convert AG0, AG1 and AG2 into the first 8-bit output address data; De2 is used to convert AG3, AG4 and AG5 into the second 8-bit output address data; De3 is used to convert AG6 and AG7 into the first 4-bit output address data; and De4 is used to convert AG8 and AG9 into the second 4-bit output address data.

The address generation module 63 is electrically connected to an output end of De1, an output end of De2, an output end of De3, and an output end of De4, and is configured to process the first 8-bit output address data, the second 8-bit output address data, the first 4-bit output address data and the second 4-bit output address data, to obtain the row number of the pixel circuits to be operated.

The row number available to the address generation module 63 is 1024.

As shown in FIG. 12, when the number of bits of the address data carried by the parallel output signals is 12 bits, A0, A1, A2, A3, A4, A5, A6, A7, A8, A9, A10 and A11 denote the first bit address data, the second bit address data, the third bit address data, the fourth bit address data, the fifth bit address data, the sixth bit address data, the seventh bit address data, the eighth bit address data, the ninth bit address data, the tenth bit address data, the eleventh bit address data and the twelfth bit address data, respectively.

The address latch module 61 converts the 12-bit address data into 12-bit output address data, AG0 denotes the first bit output address data, AG1 denotes the second bit output address data, AG2 denotes the third bit output address data, AG3 denotes the fourth bit output address data, AG4 denotes the fifth bit output address data, AG5 denotes the sixth bit output address data, AG6 denotes the seventh bit output address data, AG7 denotes the eighth bit output address data, AG8 denotes the ninth bit output address data, AG9 denotes the tenth bit output address data, AG10 denotes the eleventh bit output address data, and AG11 denotes the twelfth bit output address data. The address decoding module may include four 3-8 decoders.

In FIG. 12, De1 denotes a first 3-8 decoder, De2 denotes a second 3-8 decoder, De3 denotes a third 3-8 decoder, and De4 denotes a fourth 3-8 decoder; De1 is used to convert AG0, AG1 and AG2 into the first 8-bit output address data; De2 is used to convert AG3, AG4 and AG5 into the second 8-bit output address data; De3 is used to convert AG6, AG7 and AG8 into the third 8-bit output address data; and De4 is used to convert AG9, AG10 and AG11 into the fourth 8-bit output address data.

The address generation module 63 is electrically connected to an output end of De1, an output end of De2, an output end of De3, and an output end of De4, and is configured to process the first 8-bit output address data, the second 8-bit output address data, the third 8-bit output address data and the fourth 8-bit output address data, to obtain the row number of the pixel circuits to be operated.

The row number available to the address generation module 63 is 4096.

In a possible embodiment of the present disclosure, the gate line selection circuit includes a plurality of gate line selection modules, and each gate line selection module corresponds to the pixel circuits arranged in one row; the address generation module is configured to generate a switch indication signal, provide the switch indication signal for indicating on to the gate line selection module corresponding to the pixel circuits in operation rows, and provide the switch indication signal for indicating off to the gate line selection module corresponding to the pixel circuits in non-operation rows; the gate line selection module includes a first inverter, a first transmission gate, a switch transistor, a first NAND gate, a second inverter, a third inverter, a fourth inverter and a fifth inverter; the switch indication signal is applied to an input end of the first inverter, and an output end of the first inverter is electrically connected to a gate electrode of the switch transistor; an input end of the first transmission gate is electrically connected to a transmission control end, an output end of the first transmission gate is electrically connected to a first input end of the first NAND gate; a positive-phase control end of the first transmission gate is electrically connected to the output end of the first inverter, a negative-phase control end of the first transmission gate is electrically connected to the input end of the first inverter, and the first transmission gate is configured to transmit the signal applied to the input end of the first transmission gate to the output end of the first transmission gate when a high-voltage signal is applied to the positive-phase control end of the first transmission gate; a second input end of the first NAND gate is electrically connected to a discharge control end, and a discharge control signal is applied to the discharge control end; an input end of the second inverter is electrically connected to an output end of the first NAND gate, an output end of the second inverter is electrically connected to an input end of the third inverter, an output end of the third inverter is electrically connected to an input end of the fourth inverter, and an output end of the fourth inverter is configured to provide a first gate driving signal to a corresponding row; and an input end of the fifth inverter is electrically connected to the output end of the second inverter, and an output end of the fifth inverter is configured to provide a second gate driving signal to a corresponding row.

Figure 13:
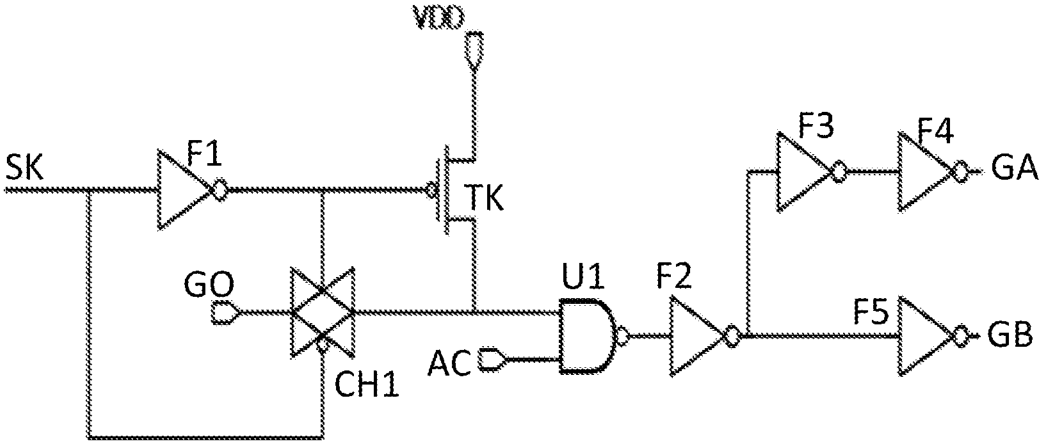
FIG. 13 is a schematic view showing a gate line selection module according to one embodiment of the present disclosure.

As shown in FIG. 13, in a possible embodiment of the present disclosure, the gate line selection module may include a first inverter F1, a first transmission gate CH1, a switch transistor TK, a first NAND gate U1, a second inverter F2, a third inverter F3, a fourth inverter F4 and a fifth inverter F5.

The switch indication signal SK is applied to an input end of the first inverter F1, and an output end of the first inverter F1 is electrically connected to a gate electrode of the switch transistor TK.

An input end of the first transmission gate CH1 is electrically connected to a transmission control end GO, an output end of the first transmission gate CH1 is electrically connected to a first input end of the first NAND gate U1; a positive-phase control end of the first transmission gate CH1 is electrically connected to the output end of the first inverter F1, a negative-phase control end of the first transmission gate CH1 is electrically connected to the input end of the first inverter F1, and the first transmission gate CH1 is configured to transmit the signal applied to the input end of the first transmission gate CH1 to the output end of the first transmission gate CH1 when a high-voltage signal is applied to the positive-phase control end of the first transmission gate CH1.

A second input end of the first NAND gate U1 is electrically connected to a discharge control end AC, and a discharge control signal is applied to the discharge control end AC.

An input end of the second inverter F2 is electrically connected to an output end of the first NAND gate U1, an output end of the second inverter F2 is electrically connected to an input end of the third inverter F3, an output end of the third inverter F3 is electrically connected to an input end of the fourth inverter F4, and an output end of the fourth inverter F4 is configured to provide a first gate driving signal to a first gate line GA arranged in a corresponding row.

An input end of the fifth inverter F5 is electrically connected to the output end of the second inverter F2, and an output end of the fifth inverter F5 is configured to provide a second gate driving signal to a second gate line GB arranged in a corresponding row.

In a possible embodiment of the present disclosure, the transmission control signal is applied to the transmission control end; and the data providing circuit is configured to provide the transmission control signal after a row of display data is transmitted.

In a possible embodiment of the present disclosure, during an operation of the gate line selection module shown in FIG. 13, the address generation module is configured to generate the switch indication signal, provide the switch indication signal for indicating on to the gate line selection module corresponding to the pixel circuits in operation rows, and provide the switch indication signal for indicating off to the gate line selection module corresponding to the pixel circuits in non-operation rows; the switch indication signal for indicating on may be a low voltage signal, and the switch indication signal for indicating off may be a high voltage signal.

When AC outputs a high voltage signal and SK is a low voltage signal, F1 outputs a high voltage signal, TK is turned off, the high voltage signal is applied to the positive-phase control end of CH1, the low voltage signal is applied to the negative-phase control end of CH1; and when the GO outputs a low voltage signal, the low voltage signal is applied to the first input end of U1, U1 outputs a high voltage signal, F2 outputs a low voltage signal, F3 outputs a high voltage signal, F4 outputs a low voltage signal, F5 provides a high voltage signal, i.e., the first gate driving signal at the corresponding row is a low voltage signal, the second gate driving signal at the corresponding row is a high voltage signal, and the pixel circuits arranged in the corresponding row works are operated.

When AC outputs a high voltage signal and SK is a low voltage signal, F1 outputs a high voltage signal, TK is turned off, the high voltage signal is applied to the positive-phase control end of CH1, the low voltage signal is applied to the negative-phase control end of CH1; and when the GO outputs a high voltage signal, the high voltage signal is applied to the first input end of U1, U1 outputs a low voltage signal, F2 outputs a high voltage signal, F3 outputs a low voltage signal, F4 outputs a high voltage signal, F5 provides a low voltage signal, i.e., the first gate driving signal at the corresponding row is a high voltage signal, the second gate driving signal at the corresponding row is a high voltage signal, and the pixel circuits arranged in the corresponding row works are turned off.

When there is a need to discharge the pixel circuits arranged in all the rows included in the display panel, AC may be set as a low voltage signal, at this time, U1 outputs a high voltage signal, F2 outputs a low voltage signal, F3 outputs a high voltage signal, F4 outputs a low voltage signal, and F5 provides a high voltage signal, i.e., the first gate driving signal at the corresponding row is a low voltage signal, the second gate driving signal at the corresponding row is a high voltage signal, and the pixel circuits arranged in all the rows are discharged.

In a possible embodiment of the present disclosure, the data transmission module includes a plurality of multiplexing units; and each multiplexing unit receives a corresponding transmission control clock signal and at least two bits of data in the input display data, and selects and outputs one bit of data in the at least two bits of data in accordance with the transmission control clock signal.

During the implementation, the data transmission module may include a plurality of multiplexing units, and the multiplexing units select and output one bit of data in at least two bits of data in accordance with the transmission control signal.

In a possible embodiment of the present disclosure, the transmission control signal is provided by the mode conversion module may generate a first transmission control signal QA and a second transmission control signal QB corresponding to a current display mode in accordance with the mode indication information, the data transmission control module is configured to receive the first transmission control signal QA and the second transmission control signal QB and generate a transmission control clock signal corresponding to the current display mode in accordance with the first transmission control signal QA, the second transmission control signal QB and the at least one bit of information in the mode indication information.

In a possible embodiment of the present disclosure, the data transmission module includes C groups of multiplexing units, and each group of multiplexing units includes D multiplexing units; where C and D are integers greater than 1; each row of input display data includes C input display data groups; and at least two bits of data in a e-th input display data group are applied to the D multiplexing units included in the c-th group of multiplexing units.

Optionally, C is, but not limited, equal to 12, and D is, but not limited, equal to 12.

Figure 14:
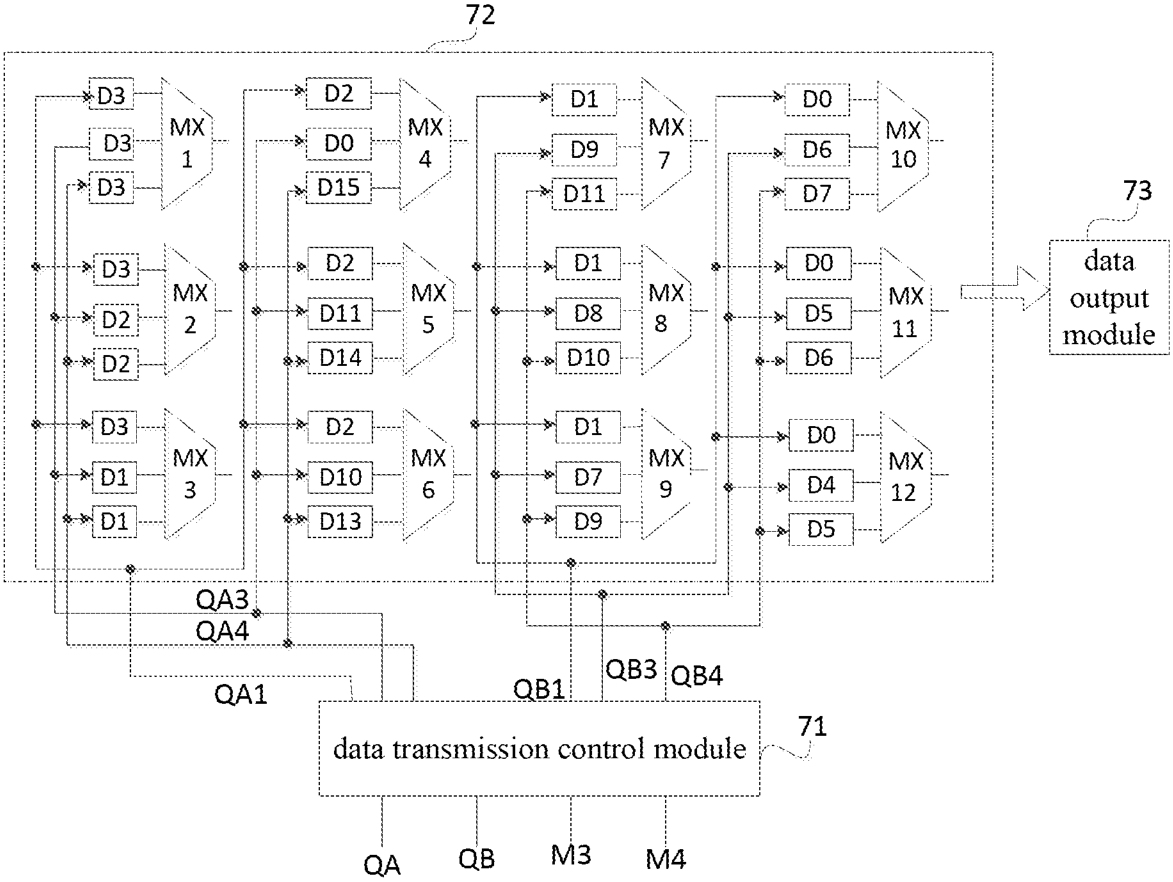
FIG. 14 is a schematic view showing a data providing circuit according to one embodiment of the present disclosure.

As shown in FIG. 14, the data transmission control module 71 receives the first transmission control signal QA, the second transmission control signal QB, the fourth mode indication bit M3 and the fifth mode indication bit M4, and performs a logic operation on the first transmission control signal QA, the second transmission control signal QB, the fourth mode indication bit M3 and the fifth mode indication bit M4. A first transmission control clock signal QA1, a second transmission control clock signal QA3, a third transmission control clock signal QA4, a fourth transmission control clock signal QB1, a fifth transmission control clock signal QB3, and a sixth transmission control clock signal QB4 are obtained and provided to the data transmission module 72.

Each group of multiplexing units included in the data transmission module 72 may include a first multiplexing unit MX1, a second multiplexing unit MX2, a third multiplexing unit MX3, a fourth multiplexing unit MX2, a fifth multiplexing unit MX5, a sixth multiplexing unit MX6, a seventh multiplexing unit MX7, an eighth multiplexing unit MX8, a ninth multiplexing unit MX9, a tenth multiplexing unit MX10, an eleventh multiplexing unit MX11 and a twelfth multiplexing unit MX12.

A first input end of MX1 is connected to D3, a second input end of MX1 is connected to D3, a third input end of MX1 is connected to D3, and an MUX1 controls an output end of MX1 to be connected to the first input end of MX1, the second input end of MX1 or the third input end of MX1 in accordance with QA1, QA3 and QA4.

A first input end of MX2 is connected to D3, a second input end of MX2 is connected to D2, a third input end of MX2 is connected to D2, and an MUX2 controls an output end of MX2 to be connected to the first input end of MX2, the second input end of MX2 or the third input end of MX2 in accordance with QA1, QA3 and QA4.

A first input end of MX3 is connected to D3, a second input end of MX3 is connected to D1, a third input end of MX3 is connected to D1, and an MUX3 controls an output end of MX3 to be connected to the first input end of MX3, the second input end of MX3 or the third input end of MX3 in accordance with QA1, QA3 and QA4.

A first input end of MX4 is connected to D2, a second input end of MX4 is connected to DO, a third input end of MX4 is connected to D15, and an MUX4 controls an output end of MX4 to be connected to the first input end of MX4, the second input end of MX4 or the third input end of MX4 in accordance with QA1, QA3 and QA4.

A first input end of MX5 is connected to D2, a second input end of MX5 is connected to D11, a third input end of MX5 is connected to D14, and an MUX5 controls an output end of MX5 to be connected to the first input end of MX5, the second input end of MX5 or the third input end of MX5 in accordance with QA1, QA3 and QA4.

A first input end of MX6 is connected to D2, a second input end of MX6 is connected to D10, a third input end of MX6 is connected to D13, and an MUX6 controls an output end of MX6 to be connected to the first input end of MX6, the second input end of MX6 or the third input end of MX6 in accordance with QA1, QA3 and QA4.

A first input end of MX7 is connected to D1, a second input end of MX7 is connected to D9, a third input end of MX7 is connected to D11, and an MUX7 controls an output end of MX7 to be connected to the first input end of MX7, the second input end of MX7 or the third input end of MX7 in accordance with QB1, QB3 and QB4.

A first input end of MX8 is connected to D1, a second input end of MX8 is connected to D8, a third input end of MX8 is connected to D10, and an MUX8 controls an output end of MX8 to be connected to the first input end of MX8, the second input end of MX8 or the third input end of MX8 in accordance with QB1, QB3 and QB4.

A first input end of MX9 is connected to D1, a second input end of MX9 is connected to D7, a third input end of MX9 is connected to D9, and an MUX9 controls an output end of MX9 to be connected to the first input end of MX9, the second input end of MX9 or the third input end of MX9 in accordance with QB1, QB3 and QB4.

A first input end of MX10 is connected to DO, a second input end of MX10 is connected to D6, a third input end of MX10 is connected to D7, and an MUX10 controls an output end of MX10 to be connected to the first input end of MX10, the second input end of MX10 or the third input end of MX10 in accordance with QB1, QB3 and QB4.

A first input end of MX11 is connected to DO, a second input end of MX11 is connected to D5, a third input end of MX11 is connected to D6, and an MUX11 controls an output end of MX11 to be connected to the first input end of MX11, the second input end of MX11 or the third input end of MX11 in accordance with QB1, QB3 and QB4.

A first input end of MX12 is connected to DO, a second input end of MX12 is connected to D4, a third input end of MX12 is connected to D5, and an MUX12 controls an output end of MX12 to be connected to one of the first input end of MX12, the second input end of MX12 or the third input end of MX12 in accordance with QB1, QB3 and QB4.

The output data from each multiplexing unit is output to the data output module 73.

During the implementation, the data transmission module may include 12 groups of multiplexing units, and each group of multiplexing units may include 12 multiplexing units, i.e., 144 display data may be provided by the data transmission module simultaneously.

Optionally, the driving module includes F serial-parallel conversion circuits and F data providing circuits; where F is an integer greater than 1, and f is a positive integer less than or equal to F; at least one of the F serial-parallel conversion circuits is configured to provide address data to the address processing circuit; at least one of the F serial-parallel conversion circuits is configured to provide a common electrode voltage corresponding to a current display mode; an f-th serial-parallel conversion circuit is electrically connected to an f-th data providing circuit, and is configured to output the input display data carried by the parallel output signal generated by the f-th serial-parallel conversion circuit to the f-th data providing circuit; and the f-th data providing circuit is configured to convert the input display data carried by the parallel output signal generated by the f-th serial-parallel conversion circuit to obtain f-th output display data and transmit the f-th output display data to a corresponding data line.

During the implementation, it is assumed that a system clock period is 500 ns and the resolution of the display panel is 200×200. It means that in a color display mode, 6+10+600 data are transmitted on each row, i.e., the time for refreshing the pixel circuits arranged in each row in the display panel is 308 us. It means that the higher the lateral resolution is, the larger the amount of data per row is, and the longer it takes to refresh the pixel circuits arranged in each row in the display panel.

When the lateral resolution is increased, the amount of display data corresponding to the pixel circuits arranged in each row is increased, it is able to shorten the row refreshing time through increasing the number of the serial-parallel conversion circuits and the number of the data providing circuits. Taking a display product with Extended Graphics Array (XGA) resolution as an example, the driving module includes 16 serial-parallel conversion circuits and 16 data providing circuits, and the serial input signal is also split into 16. For a high-resolution display product, the display data may be split to shorten the row refreshing time, i.e., the display data may be split into 16 groups, and each group of data includes 144 data. When the 16 groups of data are refreshed synchronously, the row refreshing time is 80 us, and the row refreshing time is greatly shortened. During the implementation, the number of the serial-parallel conversion circuits and the number of the data providing circuits may be increased in accordance with the requirement of the lateral resolution, so as to shorten the refreshing time of a single row.

Figure 15A:
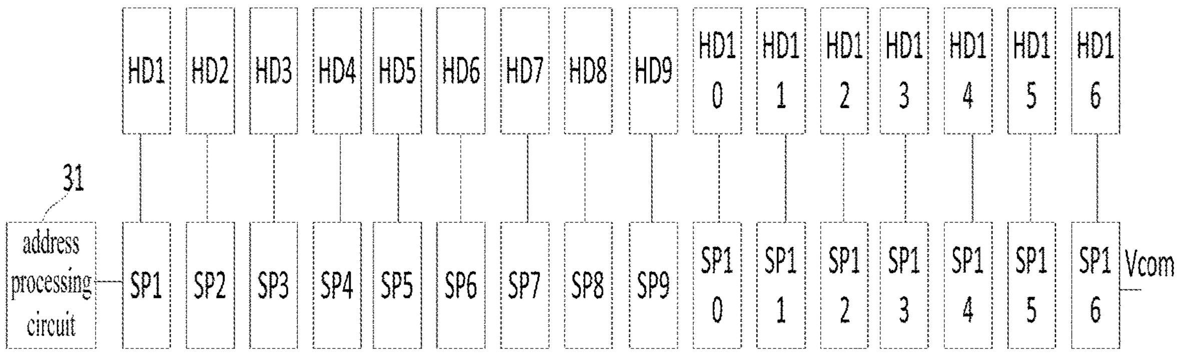
FIG. 15A is still yet another schematic view showing the driving module according to one embodiment of the present disclosure.

As shown in FIG. 15A, the driving module includes 16 serial-parallel conversion circuits and 16 data providing circuits, a first serial-parallel conversion circuit is configured to provide the address data to the address processing circuit, and a sixteenth serial-parallel conversion circuit SP16 is configured to provide the common electrode voltage Vcom corresponding to a current display mode.

In FIG. 15A, SP1 denotes a first serial-parallel conversion circuit, SP2 denotes a second serial-parallel conversion circuit, SP3 denotes a third serial-parallel conversion circuit, SP4 denotes a fourth serial-parallel conversion circuit, SP5 denotes a fifth serial-parallel conversion circuit, SP6 denotes a sixth serial-parallel conversion circuit, SP7 denotes a seventh serial-parallel conversion circuit, SP8 denotes an eighth serial-parallel conversion circuit, SP9 denotes a ninth serial-parallel conversion circuit, SP10 denotes a tenth serial-parallel conversion circuit, SP11 denotes an eleventh serial-parallel conversion circuit, SP12 denotes a twelfth serial-parallel conversion circuit, SP13 denotes a thirteenth serial-parallel conversion circuit, SP14 denotes a fourteenth serial-parallel conversion circuit, SP15 denotes a fifteenth serial-parallel conversion circuit, and SP16 denotes a sixteenth serial-parallel conversion circuit.

HD1 denotes a first data providing circuit, HD2 denotes a second data providing circuit, HD3 denotes a third data providing circuit, HD4 denotes a fourth data providing circuit, HD5 denotes a fifth data providing circuit, HD6 denotes a sixth data providing circuit, HD7 denotes a seventh data providing circuit, HD8 denotes an eighth data providing circuit, HD9 denotes a ninth data providing circuit, HD10 denotes a tenth data providing circuit, HD11 denotes an eleventh data providing circuit, HD12 denotes a twelfth data providing circuit, HD13 denotes a thirteenth data providing circuit, HD14 denotes a fourteenth data providing circuit, HD15 denotes a fifteenth data providing circuit, and HD16 denotes a sixteenth data providing circuit.

SP1 is electrically connected to HD1, SP2 is electrically connected to HD2, SP3 is electrically connected to HD3, SP4 is electrically connected to HD4, SP5 is electrically connected to HD5, SP6 is electrically connected to HD6, SP7 is electrically connected to HD7, SP8 is electrically connected to HD8, SP9 is electrically connected to HD9, SP10 is electrically connected to HD10, SP11 is electrically connected to HD11, SP12 is electrically connected to HD12, SP13 is electrically connected to HD13, SP14 is electrically connected to HD14, SP15 is electrically connected to HD15, and SP16 is electrically connected to HD16; and SP1 is electrically connected to the address processing circuit 31.

Figure 15B:
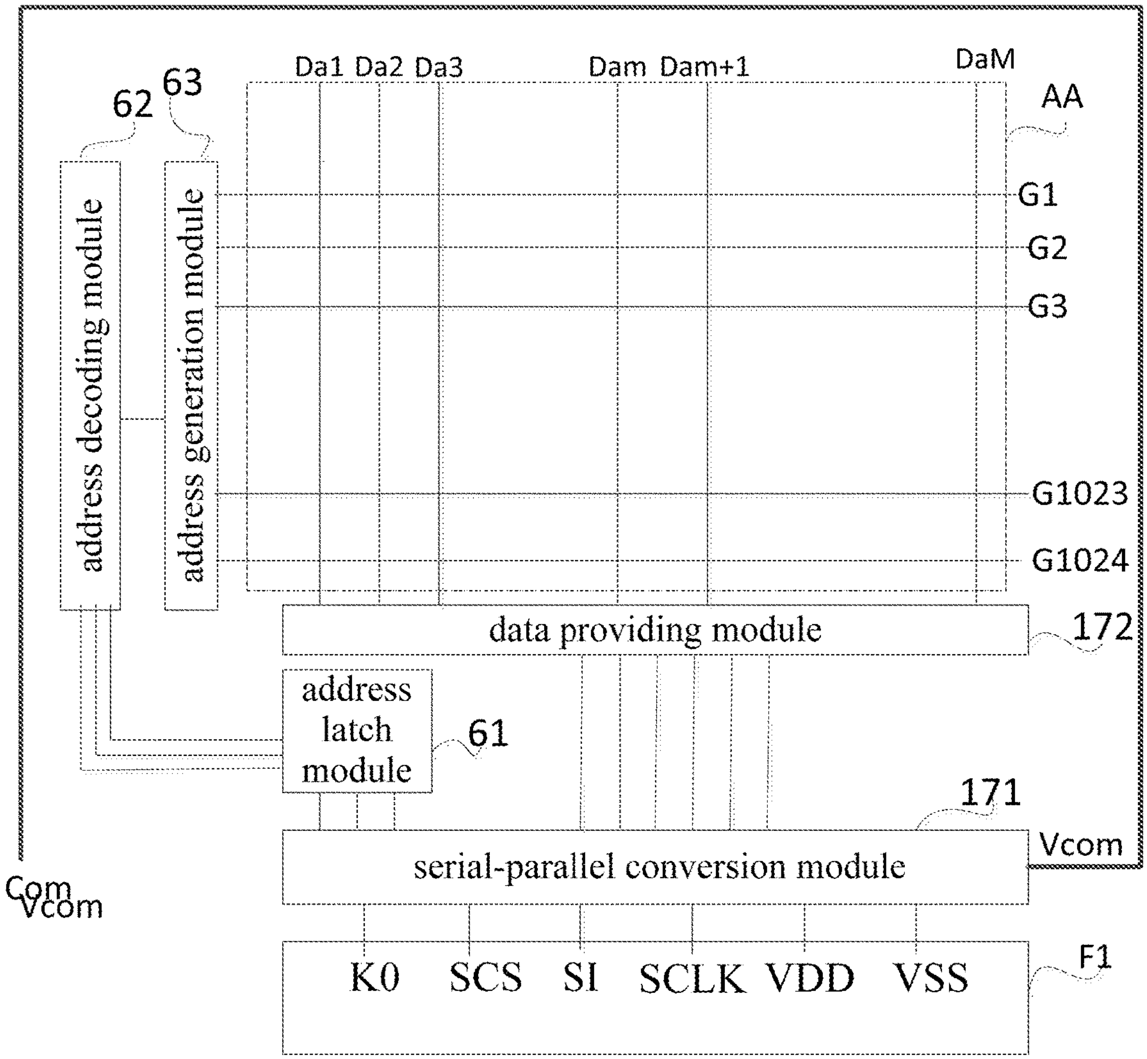
FIG. 15B is another schematic view showing the display device according to one embodiment of the present disclosure.

As shown in FIG. 15B, G1 denotes a gate line arranged in a first row, G2 denotes a gate line arranged in a second row, G3 denotes a gate line arranged in a third row, G1023 denotes a gate line arranged in a 1023rd row, and G1024 denotes a gate line arranged in a 1024rd row.

In FIG. 15B, 172 denotes a data providing module, 171 denotes a serial-parallel conversion module, the data providing module may include at least one data providing circuit, and the serial-parallel conversion module may include at least one serial-parallel conversion circuit.

In FIG. 15B, Da1 denotes a data line arranged in a first column, Da2 denotes a data line arranged in a second column, Da3 denotes a data line arranged in a third column, Dam denotes a data line arranged in an m-th column, Dam+1 denotes a data line arranged in an (m+1)-th column, and DaM denotes a data line arranged in an M-th column, where both m and M are positive integers.

In FIG. 15B, 61 denotes the address latch module, 62 denotes the address decoding module, 63 denotes the address generation module, Vcom denotes the common electrode voltage generated by the serial-parallel conversion circuit 11, and AA denotes a valid display region of the display panel. The serial-parallel conversion circuit 11 provides the common electrode voltage Vcom to a common electrode voltage line Com.

In FIG. 15B, K0 denotes a switch signal, SCS denotes a chip selection signal, SCLK denotes a system clock signal, SI denotes a serial input signal, VDD denotes a high voltage signal, and VSS denotes a low voltage signal; K0, SCS, SCLK, SI, VDD, and VSS may all be provided by a chip F1, and F1 may be an FPC.

There are three ways to realize the expansion of vertical resolution.

(1) Increase the number of bits of the address data in the serial input signal. For example, when the number of bits of the address data is increased to 11, it may be extended to 2048 rows, when the number of bits of the address data is increased to 12, it may be extended to 4096 rows, and when the number of bits of the address data is increased to N, the number of supported rows is 2N, where N is a positive integer. In this way, an address processing circuit with a more complex logic is required.

(2) Increase the number of the serial-parallel conversion circuits and the number of the data providing circuits, and increase the number of the address processing circuits. Each serial-parallel conversion circuit may provide the address data to the address processing circuits, i.e., N serial-parallel conversion circuits and N address processing circuits may drive 1024×N gate lines, where N is a positive integer.

(3) Use a Gate On Array (GOA) to drive the gate lines. The number of rows of the gate electrodes to be driven is not limited by the data volume of an address selection portion of a serial-parallel processing circuit, the entire display panel does not need a source driver, and a chip only needs to support the input signal requirements of the GOA. In this way, the gate electrodes included in the display panel are refreshed row by row rather than locally, it is only suitable for products with low display frequency. In addition, the method with GOA to drive the gate lines may be used for, but not limited to, pixels with the MIP technology, and may be further used for common pixel structures used in liquid crystal display (LCD).

In a possible embodiment of the present disclosure, the driving module includes at least two address processing circuits, F serial-parallel conversion circuits and F data providing circuits; where F is an integer greater than 1, and f is a positive integer less than or equal to F; at least two of the F serial-parallel conversion circuits are configured to provide address data to corresponding address processing circuits respectively; at least one of the F serial-parallel conversion circuits is configured to provide a common electrode voltage corresponding to a current display mode; an f-th serial-parallel conversion circuit is electrically connected to an f-th data providing circuit, and is configured to output the input display data carried by the parallel output signal generated by the f-th serial-parallel conversion circuit to the f-th data providing circuit; and the f-th data providing circuit is configured to convert the input display data carried by the parallel output signal generated by the f-th serial-parallel conversion circuit to obtain f-th output display data and transmit the f-th output display data to a corresponding data line.

Figure 16:
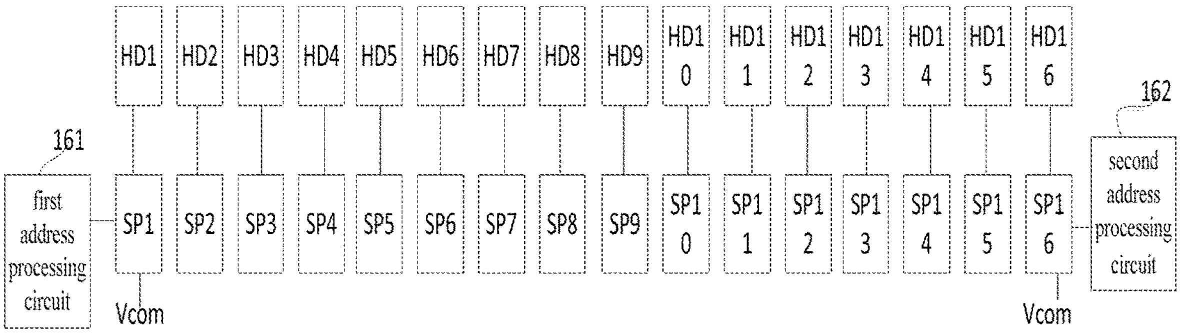
FIG. 16 is still yet another schematic view showing the driving module according to one embodiment of the present disclosure.

As shown in FIG. 16, the driving module includes 16 serial-parallel conversion circuits, 16 data providing circuits and two address processing circuits, the first serial-parallel conversion circuit SP1 is configured to provide the address data to a first address processing circuit 161, a sixteenth serial-parallel conversion circuit SP16 is configured to provide the address data to a second address processing circuit 162, and SP1 and SP16 may provide a common electrode voltage Vcom corresponding to a current display mode.

In FIG. 16, SP1 denotes a first serial-parallel conversion circuit, SP2 denotes a second serial-parallel conversion circuit, SP3 denotes a third serial-parallel conversion circuit, SP4 denotes a fourth serial-parallel conversion circuit, SP5 denotes a fifth serial-parallel conversion circuit, SP6 denotes a sixth serial-parallel conversion circuit, SP7 denotes a seventh serial-parallel conversion circuit, SP8 denotes an eighth serial-parallel conversion circuit, SP9 denotes a ninth serial-parallel conversion circuit, SP10 denotes a tenth serial-parallel conversion circuit, SP11 denotes an eleventh serial-parallel conversion circuit, SP12 denotes a twelfth serial-parallel conversion circuit, SP13 denotes a thirteenth serial-parallel conversion circuit, SP14 denotes a fourteenth serial-parallel conversion circuit, SP15 denotes a fifteenth serial-parallel conversion circuit, and SP16 denotes a sixteenth serial-parallel conversion circuit.

HD1 denotes a first data providing circuit, HD2 denotes a second data providing circuit, HD3 denotes a third data providing circuit, HD4 denotes a fourth data providing circuit, HD5 denotes a fifth data providing circuit, HD6 denotes a sixth data providing circuit, HD7 denotes a seventh data providing circuit, HD8 denotes an eighth data providing circuit, HD9 denotes a ninth data providing circuit, HD10 denotes a tenth data providing circuit, HD11 denotes an eleventh data providing circuit, HD12 denotes a twelfth data providing circuit, HD13 denotes a thirteenth data providing circuit, HD14 denotes a fourteenth data providing circuit, HD15 denotes a fifteenth data providing circuit, and HD16 denotes a sixteenth data providing circuit.

SP1 is electrically connected to HD1, SP2 is electrically connected to HD2, SP3 is electrically connected to HD3, SP4 is electrically connected to HD4, SP5 is electrically connected to HD5, SP6 is electrically connected to HD6, SP7 is electrically connected to HD7, SP8 is electrically connected to HD8, SP9 is electrically connected to HD9, SP10 is electrically connected to HD10, SP11 is electrically connected to HD11, SP12 is electrically connected to HD12, SP13 is electrically connected to HD13, SP14 is electrically connected to HD14, SP15 is electrically connected to HD15, and SP16 is electrically connected to HD16; and SP1 is electrically connected to the first address processing circuit 161, and SP16 is electrically connected to the second address processing circuit 162.

In a possible embodiment of the present disclosure, the driving module includes a gate driving circuit; the gate driving circuit is arranged in a peripheral region of the display panel; and the gate driving circuit is configured to generate a gate driving signal for driving the pixel circuits the pixel circuits corresponding to the row number to be operated in accordance with a driving input signal.

Figure 17:
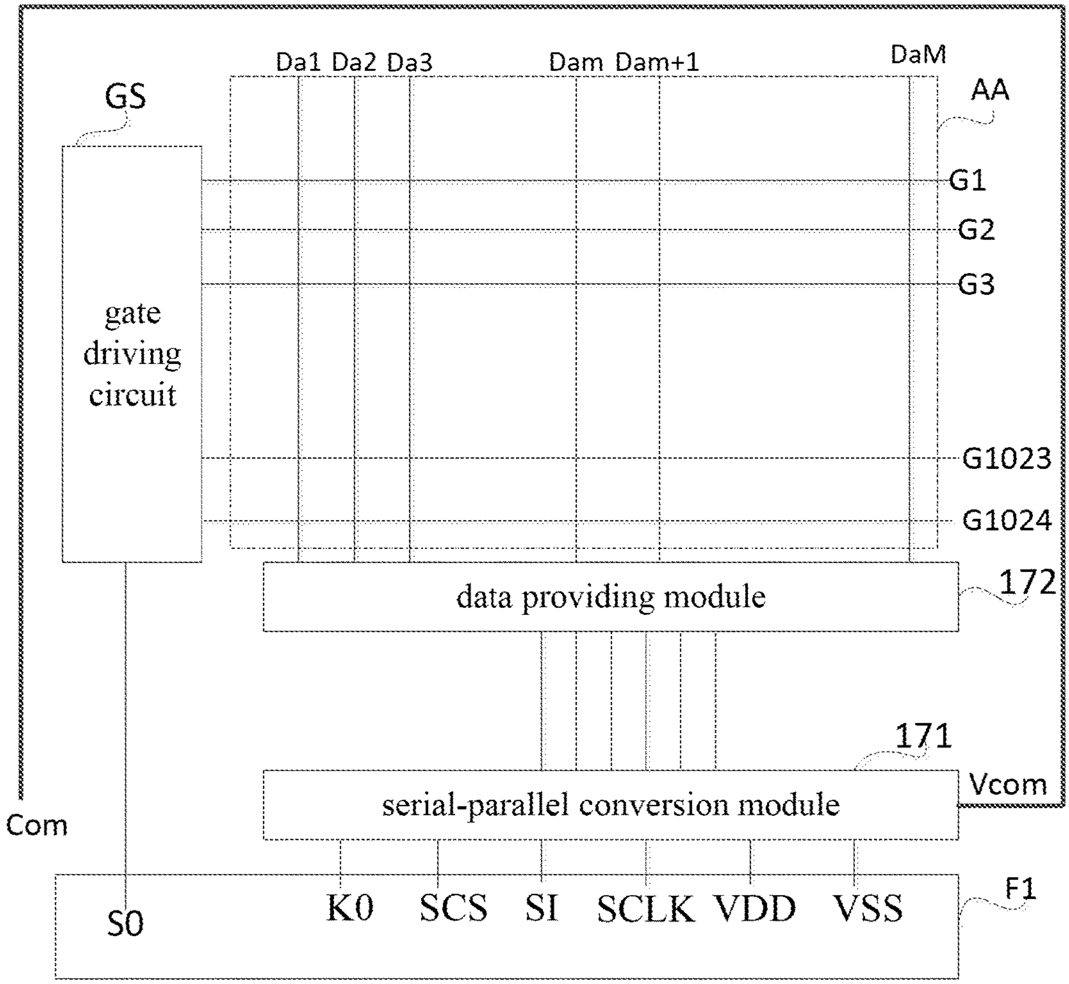
FIG. 17 is yet another schematic view showing the display device according to one embodiment of the present disclosure.

As shown in FIG. 17, in a possible embodiment of the present disclosure, a gate driving circuit GS is used to provide the gate driving signals to the gate lines arranged in the rows respectively.

In FIG. 17, G1 denotes a gate line arranged in a first row, G2 denotes a gate line arranged in a second row, G3 denotes a gate line arranged in a third row, G1023 denotes a gate line arranged in a 1023rd row, and G1024 denotes a gate line arranged in a 1024rd row.

In FIG. 17, 172 denotes a data providing module, 171 denotes a serial-parallel conversion module, the data providing module may include at least one data providing circuit, the serial-parallel conversion module may include at least one serial-parallel conversion circuit, and the serial-parallel conversion module 171 provides the common electrode voltage Vcom to a common electrode voltage line Com.

In FIG. 17, Da1 denotes a data line arranged in a first column, Da2 denotes a data line arranged in a second column, Da3 denotes a data line arranged in a third column, Dam denotes a data line arranged in an m-th column, Dam+1 denotes a data line arranged in an (m+1)-th column, and DaM denotes a data line arranged in an M-th column, where both m and M are positive integers.

In FIG. 17, S0 denotes a GOA input signal, K0 denotes a switch signal, SCS denotes a chip selection signal, SCLK denotes a system clock signal, SI denotes a serial input signal, VDD denotes a high voltage signal, and VSS denotes a low voltage signal; K0, SCS, SCLK, SI, VDD, and VSS may all be provided by a chip F1, and F1 may be an FPC.

In FIG. 17, AA denotes the valid display region of the display panel.

The display device in the embodiments of the present disclosure includes the display panel and the above-mentioned driving module.

Optionally, the display panel includes a plurality of pixel circuits arranged in rows and columns; each pixel circuit includes a first display control transmission gate, a second display control transmission gate, a third display control transmission gate and a latch ring; an input end of the first display control transmission gate is electrically connected to a data line, an output end of the first display control transmission gate is electrically connected to a negative-phase control end of the second display control transmission gate and a positive-phase control end of the third display control transmission gate, a positive-phase input end of the first display control transmission gate is electrically connected to a second gate line in a corresponding row, and a negative-phase input end of the first display control transmission gate is electrically connected to a first gate line in the corresponding row; an input end of the second display control transmission gate is electrically connected to a first display control voltage end, and an output end of the second display control transmission gate is electrically connected to a corresponding pixel electrode; an input end of the third display control transmission gate is electrically connected to a second display control voltage end, and an output end of the third display control transmission gate is electrically connected to the pixel electrode; and an input end of the latch ring is electrically connected to the positive-phase control end of the third display control transmission gate, and an output end of the latch ring is electrically connected to a negative-phase control end of the third display control transmission gate.

The display device in the embodiments of the present disclosure may be such displays as a reflective type display, a transflective display and an LCD display.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A driving module, arranged in a display device, wherein the display device comprises a display panel, the display panel comprises a plurality of gate lines arranged in rows, a plurality of data lines arranged in columns and a plurality of pixel circuits arranged in rows and columns arranged in a display region; and the driving module comprises a serial-parallel conversion circuit and a data providing circuit;

the serial-parallel conversion circuit is configured to convert a serial input signal into a parallel output signal and generate a transmission control signal and a common electrode voltage signal in accordance with mode indication information carried by the parallel output signal, and the parallel output signal carries the mode indication information and input display data; and the data providing circuit is electrically connected to the serial-parallel conversion circuit, and is configured to convert the input display data into output display data and transmit the output display data to a corresponding data line under the control of the transmission control signal;

wherein the serial-parallel conversion circuit comprises a serial-parallel conversion module, a mode conversion module and a common electrode voltage generation module;

the serial-parallel conversion module is configured to convert the serial input signal into the parallel output signal;

the mode conversion module is configured to generate the transmission control signal corresponding to a current display mode in accordance with the mode indication information carried by the parallel output signal, provide the transmission control signal and at least one bit of information in the mode indication information to the data providing circuit, and provide the mode indication information to the common electrode voltage generation module; and the common electrode voltage generation module is configured to generate a common electrode voltage, a first display control voltage and a second display control voltage corresponding to the current display mode in accordance with the mode indication information;

wherein the serial-parallel conversion module comprises an N-stage shift register, N data latches or delay latches (D latches) and M control multiplexing units; the serial input signal is applied to all input ends of the N D latches; where Nis an integer greater than 1, and M is a positive integer;

a chip selection signal is applied to a first input end of a first stage shift register, a system clock signal is applied to all second input ends of the N-stage shift register, an output end of the first stage shift register is electrically connected to a clock signal input end of a first D latch and a first input end of a second stage shift register, and the first stage shift register is configured to shift the chip selection signal under the control of the system clock signal to obtain a first output clock signal, and provide the first output clock signal to the clock signal input end of the first D latch;

an output end of an a-th stage shift register is electrically connected to a first input end of an m-th control multiplexing unit, a second input end of the m-th control multiplexing unit is electrically connected to an output end of an N-th stage shift register, an output end of the m-th control multiplexing unit is electrically connected to a first input end of an (a+1)-th stage shift register, an m-th data bit control signal is applied to a control end of the m-th control multiplexing unit, the m-th control multiplexing unit is configured to control the output end of the a-th stage shift register or the output end of the N-th stage shift register to be connected to the first input end of the (a+1)-th stage shift register under the control of the m-th data bit control signal; the system clock signal is applied to a second input end of the (a+1)-th stage shift register, an output end of the (a+1)-th stage shift register is electrically connected to a clock signal input end of an (a+1)-th stage D latch, and the (a+1)-th stage shift register is configured to shift the signal output by the output end of the a-th stage shift register under the control of the system clock signal obtain an (a+1)-th output clock signal and provide the (a+1)-th output clock signal to the clock signal input end of the (a+1)-th stage D latch;

a first input end of a b-th stage shift register is electrically connected to an output end of a (b-1)-th stage shift register, the system clock signal is applied to a second input end of the b-th stage shift register, an output end of the b-th stage shift register is electrically connected to a clock signal input end of a b-th stage D latch, and the b-th stage shift register is configured to shift the signal output from the output end of the (b-1)-th stage shift register to obtain a b-th output clock signal and provide the b-th output clock signal to the clock signal input end of the b-th stage D latch;

where a is a positive integer, b is a positive integer greater than 1, and b−1 is not equal to a; m is a positive integer less than or equal to M, and M is a positive integer; and each D latch is configured to output corresponding data in the serial input signal under the control of the signal applied to the clock signal input end of the D latch.

2. The driving module according to claim 1, wherein the parallel output signal further carries address data, and the driving module further comprises an address processing circuit; and the address processing circuit is electrically connected to the serial-parallel conversion circuit and is configured to process the address data to obtain row number of the pixel circuits to be operated.

3. The driving module according to claim 2, wherein the driving module further comprises a gate line selection circuit; the gate line selection circuit is configured to provide a gate driving signal to the gate line corresponding to the row number in accordance with the row number of the pixel circuits to be operated to control the pixel circuits corresponding to the row number to be operated.

4. The driving module according to claim 2, wherein the address processing circuit comprises an address latch module, an address decoding module and an address generation module;

the address latch module is configured to latch the address data carried by the parallel output signal to obtain output address data;

the address decoding module is electrically connected to the address latch module and is configured to decode the output address data to obtain decoded output address data;

the address generation module is configured to process the decoded output address data to obtain the row number of the pixel circuits to be operated.

5. The driving module according to claim 1, wherein the data providing circuit comprises a data transmission control module, a data transmission module and a data output module;

the data transmission control module is configured to receive the transmission control signal and generate a transmission control clock signal corresponding to the current display mode in accordance with the transmission control signal and the at least one bit of information in the mode indication information;

the data transmission module is configured to receive the input display data from the serial-parallel conversion module and convert the input display data in accordance with the transmission control clock signal to obtain an output display data group, and the output display data group comprises at least one group of output display data; and the data output module is configured to receive the output display data group and transmit the output display data in the output display data group to the corresponding data line.

6. The driving module according to claim 1, wherein the data providing circuit is configured to provide feedback signals to the M control multiplexing units after the output display data corresponding to the pixel circuits arranged in one row are all transmitted to corresponding data lines, and control the control multiplexing units to start operating after receiving the feedback signals.

7. The driving module according to claim 4, wherein the address latch module comprises a first data flip-flop or delay flip-flop (D flip-flop), a second D flip-flop and an operational amplifier;

the address data carried by the parallel output signal is applied to an input end of the first D flip-flop; an output end of the first D flip-flop is electrically connected to an input end of the second D flip-flop, an output end of the second D flip-flop is electrically connected to an input end of the operational amplifier, and the operational amplifier is configured to amplify data applied to the input end of the operational amplifier to obtain the output address data; and a first positive-phase latch control clock signal is applied to a first clock signal input end of the first D flip-flop, a first negative-phase latch control clock signal is applied to a second clock signal input end of the first D flip-flop, a second positive-phase latch control clock signal is applied to a first clock signal input end of the second D flip-flop; and a second negative-phase latch control clock signal is applied to a second clock signal input end of the second D flip-flop.

8. The driving module according to claim 4, wherein the address decoding module comprises a plurality of decoders;

the number of bits of the address data carried by the parallel output signals is P bits; the address latch module latches the address data with the P bits to obtain P-bit output address data;

each decoder decodes at least two bits of the P-bit output address data respectively to obtain the decoded output address data;

the address generation module is configured to process the decoded output address data obtained by the plurality of decoders respectively to obtain the row number of the pixel circuits to be operated.

9. The driving module according to claim 3, wherein the gate line selection circuit comprises a plurality of gate line selection modules, and each gate line selection module corresponds to the pixel circuits arranged in one row;

the address generation module is configured to generate a switch indication signal, provide the switch indication signal for indicating on to the gate line selection module corresponding to the pixel circuits in operation rows, and provide the switch indication signal for indicating off to the gate line selection module corresponding to the pixel circuits in non-operation rows;

the gate line selection module comprises a first inverter, a first transmission gate, a switch transistor, a first NAND gate, a second inverter, a third inverter, a fourth inverter and a fifth inverter;

the switch indication signal is applied to an input end of the first inverter, and an output end of the first inverter is electrically connected to a gate electrode of the switch transistor;

an input end of the first transmission gate is electrically connected to a transmission control end, an output end of the first transmission gate is electrically connected to a first input end of the first NAND gate; a positive-phase control end of the first transmission gate is electrically connected to the output end of the first inverter, a negative-phase control end of the first transmission gate is electrically connected to the input end of the first inverter, and the first transmission gate is configured to transmit the signal applied to the input end of the first transmission gate to the output end of the first transmission gate when a high-voltage signal is applied to the positive-phase control end of the first transmission gate;

a second input end of the first NAND gate is electrically connected to a discharge control end, and a discharge control signal is applied to the discharge control end;

an input end of the second inverter is electrically connected to an output end of the first NAND gate, an output end of the second inverter is electrically connected to an input end of the third inverter, an output end of the third inverter is electrically connected to an input end of the fourth inverter, and an output end of the fourth inverter is configured to provide a first gate driving signal to a corresponding row; and an input end of the fifth inverter is electrically connected to the output end of the second inverter, and an output end of the fifth inverter is configured to provide a second gate driving signal to a corresponding row.

10. The driving module according to claim 9, wherein the transmission control signal is applied to the transmission control end; and the data providing circuit is configured to provide the transmission control signal after a row of display data is transmitted.

11. The driving module according to claim 5, wherein the data transmission module comprises a plurality of multiplexing units; and each multiplexing unit receives a corresponding transmission control clock signal and at least two bits of data in the input display data, and selects and outputs one bit of data in the at least two bits of data in accordance with the transmission control clock signal.

12. The driving module according to claim 11, wherein the data transmission module comprises C groups of multiplexing units, and each group of multiplexing units comprises D multiplexing units; where C and D are integers greater than 1;

each row of input display data comprises C input display data groups; and at least two bits of data in a c-th input display data group are applied to the D multiplexing units included in the c-th group of multiplexing units.

13. The driving module according to claim 1, wherein the driving module comprises F serial-parallel conversion circuits and F data providing circuits; where F is an integer greater than 1, and f is a positive integer less than or equal to F;

at least one of the F serial-parallel conversion circuits is configured to provide address data to the address processing circuit;

at least one of the F serial-parallel conversion circuits is configured to provide a common electrode voltage corresponding to a current display mode;

an f-th serial-parallel conversion circuit is electrically connected to an f-th data providing circuit, and is configured to output the input display data carried by the parallel output signal generated by the f-th serial-parallel conversion circuit to the f-th data providing circuit; and the f-th data providing circuit is configured to convert the input display data carried by the parallel output signal generated by the f-th serial-parallel conversion circuit to obtain f-th output display data and transmit the f-th output display data to a corresponding data line.

14. The driving module according to claim 1, wherein the driving module comprises at least two address processing circuits, F serial-parallel conversion circuits and F data providing circuits; where F is an integer greater than 1, and f is a positive integer less than or equal to F;

at least two of the F serial-parallel conversion circuits are configured to provide address data to corresponding address processing circuits respectively;

at least one of the F serial-parallel conversion circuits is configured to provide a common electrode voltage corresponding to a current display mode;

an f-th serial-parallel conversion circuit is electrically connected to an f-th data providing circuit, and is configured to output the input display data carried by the parallel output signal generated by the f-th serial-parallel conversion circuit to the f-th data providing circuit; and the f-th data providing circuit is configured to convert the input display data carried by the parallel output signal generated by the f-th serial-parallel conversion circuit to obtain f-th output display data and transmit the f-th output display data to a corresponding data line.

15. The driving module according to claim 1, comprising a gate driving circuit; the gate driving circuit is arranged in a peripheral region of the display panel; and the gate driving circuit is configured to generate a gate driving signal for driving the pixel circuits the pixel circuits corresponding to the row number to be operated in accordance with a driving input signal.

16. A display device, comprising a display panel and the driving module according to claim 1.

17. The display device according to claim 16, wherein the display panel comprises a plurality of pixel circuits arranged in rows and columns; each pixel circuit comprises a first display control transmission gate, a second display control transmission gate, a third display control transmission gate and a latch ring;

an input end of the first display control transmission gate is electrically connected to a data line, an output end of the first display control transmission gate is electrically connected to a negative-phase control end of the second display control transmission gate and a positive-phase control end of the third display control transmission gate, a positive-phase input end of the first display control transmission gate is electrically connected to a second gate line in a corresponding row, and a negative-phase input end of the first display control transmission gate is electrically connected to a first gate line in the corresponding row;

an input end of the second display control transmission gate is electrically connected to a first display control voltage end, and an output end of the second display control transmission gate is electrically connected to a corresponding pixel electrode;

an input end of the third display control transmission gate is electrically connected to a second display control voltage end, and an output end of the third display control transmission gate is electrically connected to the pixel electrode; and an input end of the latch ring is electrically connected to the positive-phase control end of the third display control transmission gate, and an output end of the latch ring is electrically connected to a negative-phase control end of the third display control transmission gate.

* * * * *